United States Patent
Mizukami

(10) Patent No.: US 8,361,354 B2
(45) Date of Patent: Jan. 29, 2013

(54) OPTICAL FILM, METHOD OF MANUFACTURING THE OPTICAL FILM, POLARIZING PLATE PROTECTIVE FILM, POLARIZING PLATE USING THE PROTECTIVE FILM, AND LIQUID CRYSTAL DISPLAY

(75) Inventor: Hiromichi Mizukami, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 683 days.

(21) Appl. No.: 12/311,191

(22) PCT Filed: Aug. 18, 2007

(86) PCT No.: PCT/JP2007/066057
§ 371 (c)(1),
(2), (4) Date: Sep. 8, 2009

(87) PCT Pub. No.: WO2008/041425
PCT Pub. Date: Apr. 10, 2008

(65) Prior Publication Data
US 2011/0045210 A1   Feb. 24, 2011

(30) Foreign Application Priority Data
Sep. 29, 2006   (JP) ................. 2006-268776

(51) Int. Cl.
*B29D 11/00* (2006.01)
(52) U.S. Cl. ............... 264/1.6; 264/212; 264/217
(58) Field of Classification Search .......... 264/1.1, 264/1.6, 1.34, 212, 216, 217, 1.7
See application file for complete search history.

(56) References Cited

U.S. PATENT DOCUMENTS

| | | | |
|---|---|---|---|
| 5,028,372 A * | 7/1991 | Brierre et al. | 264/148 |
| 5,940,211 A | 8/1999 | Hikmet et al. | |
| 6,312,787 B1 | 11/2001 | Hayashi et al. | |
| 2003/0002153 A1 * | 1/2003 | Hiraishi et al. | 359/452 |
| 2006/0216437 A1 | 9/2006 | Murakami | |
| 2006/0270806 A1 * | 11/2006 | Hale | 525/439 |

FOREIGN PATENT DOCUMENTS

JP   02-001740 A   1/1990
(Continued)

OTHER PUBLICATIONS

Japanese Office Action dated Dec. 20, 2011 (and English translation thereof) in counterpart Japanese Application No. 2008-537431.

*Primary Examiner* — Mathieu D. Vargot
(74) *Attorney, Agent, or Firm* — Holtz, Holtz, Goodman & Chick, P.C.

(57) ABSTRACT

A method of manufacturing an optical film comprising: extruding a melted substance comprising a thermoplastic resin and irregularly shaped particles from a casting die on a support to form the optical film, wherein the casting die is equipped with, in the order from an upstream of an extruding direction of the melted substance: an inlet portion through which the melted substance flows in; a manifold portion; and a slit portion comprising a extending portion and a land portion, the melted substance being ejected from the land portion, wherein cross-sectional shapes of the extending portion satisfies A1<A2 and cross-sectional shapes of the land portion satisfy A3=A4, wherein A1 represents a cross-sectional area at arbitrary position in the extending portion; A2 represents a cross-sectional area at an upstream side position in the extending portion; A3 and A4 represent cross-sectional areas at different positions in the land portion.

14 Claims, 2 Drawing Sheets

FOREIGN PATENT DOCUMENTS

| | | |
|---|---|---|
| JP | 09-274108 A | 10/1997 |
| JP | 11-174231 A | 7/1999 |
| JP | 2003-043261 A | 2/2003 |
| JP | 2003-326586 A | 11/2003 |
| JP | 2006-119182 A | 5/2006 |
| JP | 2007-210216 A | 8/2007 |

* cited by examiner

OPTICAL FILM, METHOD OF MANUFACTURING THE OPTICAL FILM, POLARIZING PLATE PROTECTIVE FILM, POLARIZING PLATE USING THE PROTECTIVE FILM, AND LIQUID CRYSTAL DISPLAY

This application is the United States national phase application of International Application PCT/JP02007/066057 filed Aug. 18, 2007.

FIELD OF THE INVENTION

The present invention relates to an optical film utilized in various display devices such as a liquid crystal display (LCD) or an organic EL (electroluminescence) display and a manufacturing method thereof, specifically to a polarizing plate protective film utilized in these display devices, a polarizing plate using the same and a liquid crystal display device; and, in more detail, relates to a polarizing plate protective film having a brightness improving function, a polarizing plate at least one surface of which is provided with a film having both a brightness improving function and a polarizing plate protective function in the film and a liquid crystal display device using the same.

BACKGROUND OF THE INVENTION

Generally, light from natural light or an artificial light source is non-polarized light (randomly polarized light), however, it is possible to take out a polarized component (linear polarized light, circular polarized light, elliptic polarized light) by utilizing a polarizing plate. Nowadays, it can be also said that a widely popularized liquid crystal display device is a device which displays images utilizing characteristics of polarized light by assembling said polarizing plate.

As a polarizing film applied for a polarizing plate, generally utilized is a light absorptive type polarizing film contain a polyvinyl alcohol type film. A polyvinyl alcohol type polarizing film is manufactured by stretching a polyvinyl alcohol type film and adsorbing iodine or dichroic dye thereon.

The transmitting axis (polarizing axis) of a polarizing film corresponds to the direction perpendicular to the stretching direction of the film. A light absorptive type polarizing film transmits only the polarized component parallel to the polarizing axis and absorbs the polarized component which is perpendicular to said axis. Therefore, utilizing efficiency of light is theoretically not more than 50% (practically a further lower value).

As a technique to depress a loss due to light absorption by a polarizing plate, known is a light utilization efficiency improvement means of a light source utilizing anisotropy in polarized light scattering in a transparent type liquid crystal display device, which is widely utilized in a brightness improving film. A polarizing film provided with anisotropy in polarized light scattering is one which utilizes a property of film prepared by stretching a complex substance of polymer and liquid crystal to form anisotropy in polarized light scattering (described in Liquid crystals, vol. 15, No. 3, pp. 395-407 (1993)), and transmits only the polarized component parallel to the polarizing axis similarly to a light absorptive type polarizing film. However, the polarizing film provided with anisotropy in polarized light scattering does not absorb the polarized component in the perpendicular direction to the polarizing axis but scatters forward or backward, resulting in improvement in a light utilization efficiency of the polarizing film.

Patent Document 1 Japanese Patent Application Publication Open to Public Inspection No. 9-274108 (hereinafter, referred to as JP-A)
Patent Document 2 JP-A No. 11-174231

Here, in patent documents 1 and 2, proposed is a method to manufacture a substance having anisotropy in polarized light scattering by blending a polymer having a positive intrinsic birefringence and a polymer having a negative intrinsic birefringence, followed by uniaxially stretching the resultant polymer.

DISCLOSURE OF THE INVENTION

Problems to be Solved by the Invention

However, there have been problems that an applicable polymer type is limited due to a required very large stretching ratio to achieve a high orientation property to achieve a sufficient brightness improvement effect, as well as that a birefringence of the polymer itself, which is not necessary as a display material, is generated due to an excess stretching of the polymer.

On the other hand, a polarizing plate is subjected to a physical protection to maintain the shape and to avoid abrasion, in addition to a durability protection against a circumferential change based on such as light, heat, oxygen and moisture, by being pasted with protective films on the both surfaces of the polarizing film.

As a polarizing plate protective film, a film constituted of cellulose ester is generally utilized, however, said film is usually provided with a birefringent property and there generally exist a retardation value within the film plane and in the film thickness direction.

For example, as described in JP-A 2003-43261 (Patent Document 3), a polarizing plate generally has a constitution in which the above-described protective film having a retardation value in the film plane and in the film thickness direction is pasted up on each of the both surfaces of a dichroic polarizing film to form a polarizing plate and a film having anisotropy in polarized light scattering (namely, a brightness improvement film) is further pasted up on one surface of said polarizing plate.

In such a case when a film having anisotropy in polarized light scattering and a dichroic polarizing film are arranged in a manner as described above and a film having a birefringent property is provided between them, the film having a birefringent property functions as a retardation film.

As a result, when a film having a birefringent property exists between the both members, change of transmittance or color hue in optical characteristics of display may occur, which becomes a factor to cause display of an unnecessary image. Therefore, it has been desired that a film exhibiting a birefringent property does not exist between a film having anisotropy in polarized light scattering and a dichroic polarizing film.

Further, in Patent Document 3, disclosed is a method to provide a liquid crystalline compound as an anisotropic polarized light scattering layer on a transparent support by coating, however, this method had a problem of low productivity.

Further, as disclosed in Japanese Translation of PCT Patent Application Publication No. 11-509014 (Patent Document 4), a film having anisotropy in polarized light scattering (also referred to as a brightness improvement film), in which the refractive index of an optical continuous phase and the refractive index of the transmission axis side of a domain having optical anisotropy are practically the same, can improve brightness by transmitting prescribed polarized light while selectively scattering other polarized light to reuse the scattered light.

However, the domains having optical anisotropy are necessary to be printed in the same direction to achieve a sufficient brightness improvement effect, and there has been a problem that preparation of a material provided with these conditions was very difficult.

An object of the present invention is to provide an optical film which exhibits enhanced optical characteristics such as a brightness improving effect, strength of the optical film, a suitable property as a polarizing plate protective film and an excellent manufacturing stability; and a manufacturing method thereof, which can be achieved by increasing the orientation degree of irregularly shaped particles (which corresponds to the aforesaid domain provided with optical anisotropy) in the optical film.

Further, an object of the present invention is to provide a polarizing plate protective film which can improve optical characteristics, specifically brightness of a display, and is excellent in productivity and durability, which can be achieved by providing a polarizing plate protective film itself having anisotropy in polarized light scattering; to provide a polarizing plate employing said polarizing plate protective film; and to provide liquid crystal display device employing said polarizing plate.

Means to Solve the Problems

The above-described object of the present invention can be achieved by the following constitutions.

1. A method of manufacturing an optical film comprising:
extruding a melted substance comprising a thermoplastic resin and irregularly shaped particles on a support from a casting die to form the optical film, wherein
the casting die is equipped with, in the order from an upstream of an extruding direction of the melted substance:
an inlet portion through which the melted substance flows in;
a manifold portion; and
a slit portion comprising a extending portion and a land portion, the melted substance being ejected from the land portion,
wherein
cross-sectional shapes of the extending portion satisfies following equation (1) and cross-sectional shapes of the land portion satisfy following equation (2):

$$A1 < A2 \quad (1)$$

wherein
A1 represents a cross-sectional area at arbitrary position P1 in the intermediate die extending portion and A2 represents a cross-sectional area at position P2 which is in upstream of the extrusion direction of the melted substance in the extending portion, and $$A3 = A4 \quad (2)$$

wherein
A3 and A4 represent cross-sectional areas at arbitrary positions P3 and P4, respectively, in the land portion, positions P3 and P4 being different from each other.

2. The method of manufacturing the optical film described in item 1, wherein a length of a land portion is 40-200 mm.

3. A method of manufacturing an optical film comprising:
extruding a melted substance comprising a thermoplastic resin and irregularly shaped particles from a casting die on a support to form the optical film, wherein
the casting die is equipped with, in the order from an upstream of an extruding direction of the melted substance:
an inlet portion through which the melted substance flows in;
a manifold portion; and
a land portion from which the melted substance is ejected, wherein
cross-sectional shapes of the manifold portion satisfies following equation (3) and cross-sectional shapes of the land portion satisfy following equation (4):

$$A5 < A6 \quad (3)$$

wherein
A5 represents a cross-sectional area at arbitrary position P5 in the manifold portion and A6 represents a cross-sectional area at position P6 which is in upstream of the extrusion direction of the melted substance in the manifold portion, and $$A7 = A8 \quad (4)$$

wherein
A7 and A8 represent cross-sectional areas at arbitrary positions P7 and P8, respectively, in the land portion, positions P7 and P8 being different from each other.

4. The method of manufacturing the optical film described in item 3, wherein the length of a land portion is 40-200 mm.

5. The method of manufacturing the optical film described in any one of items 1-4, wherein an aspect ratio of the irregularly shaped particles is not less than 2.

6. The method of manufacturing the optical film described in any one of items 1-5, wherein an aspect ratio of the irregularly shaped particles is 2-40.

7. The method of manufacturing the optical film described in any one of items 1-6, wherein the irregularly shaped particles are titanium dioxide.

8. The method of manufacturing the optical film described in any one of items 1-7, wherein a mass ratio of irregularly shaped particles to cellulose ester is 0.001<(irregularly shaped particles)/(cellulose ester)<15.

9. The method of manufacturing the optical film described in any one of items 1-8, wherein a refractive index of irregularly shaped particles is 1.3-3.0.

10. An optical film manufactured by the method of manufacturing the optical film described in any one of items 1-9.

11. A polarizing plate protective film which is comprised of the optical film described in item 10, the polarizing plate protective film comprising the irregularly shaped particles and exhibiting anisotropy in polarized light and a polarizing plate protective function in a bodyering, wherein a mean value of angles formed by a long axis of each irregularly shaped particle (also referred to as orientation angles) is 0.5-40°, provided that the transport direction of the optical film when the optical film is manufactured is 0° and the lateral direction of the optical film is 90°.

12. A polarizing plate characterized in that at least one surface of which is provided with the polarizing plate protective film described in item 11.

13. A liquid crystal display device having the polarizing plate described in item 12 on at least one surface of a liquid crystal cell.

Effect of the Invention

The present invention exhibits an effect to enhance optical characteristics such as a brightness improvement effect or strength of optical film as well as to enable manufacturing of an optical film which is excellent in manufacturing stability by increasing the orientation degree of irregularly shaped particles (corresponds to the above-described domain having optical anisotropy) in an optical film.

Further, the present invention can improve optical characteristics specifically brightness of display and can provide polarizing plate protective film having excellent productivity and durability, and can provide a polarizing plate utilizing said polarizing plate protective film as well as a liquid crystal display device utilizing said polarizing plate, by providing polarizing plate protective film itself having anisotropy in polarized light scattering.

A polarizing plate at least one surface of which is provided with polarizing plate protective film comprising optical film of the present invention exhibits an effect to sufficiently play an important role to visualize the variation of orientation of a liquid crystal by an electric field.

Further, a liquid crystal display device at least one surface of which is provided with a polarizing plate of the present invention exhibits an effect of exhibiting excellent display quality.

EXPLANATION OF NUMERALS

Figure 1:
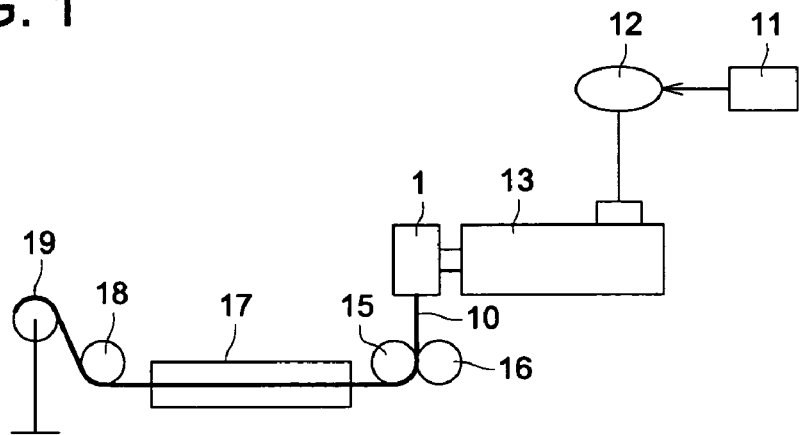
FIG. 1 is a schematic flow sheet of a device to practice a manufacturing method of the optical film of the present invention.

1: casting die
2: inlet portion
3: manifold portion
4: extending portion
5: land portion
10: web (film)
11: supply hopper
12: Henschel mixer
13: extruder
15: cooling roll
16: touch roll
17: tenter
18: transport roll
19: winder

PREFERRED EMBODIMENT OF THE INVENTION

Next, the most preferable embodiment to practice the present invention will be explained with reference to drawings, however, the present invention is not limited thereto.

In the present invention, an optical film is manufactured by a manufacturing method of an optical film by means of melt casting, in which a melted substance comprising thermoplastic resin and irregularly shaped particles having been melt kneaded is cast through a casting die on a support, followed by cooling, and the resulting web (film) is peeled off from the support, whereby an optical film is prepared.

The method of manufacturing an optical film of the present invention is particularly characterized by the form of a casting die in a casting process.

In general, a casting die for manufacturing a film is divided into an inlet portion, a manifold portion and a land portion.

In the present invention, the first invention is characterized by providing an extending portion between a manifold portion and a land portion. Further, in the third invention, a manifold portion and a land portion are directly connected and there provided no extending portion.

In the present invention, it was found that irregularly shaped particles in a dope tend to be oriented parallel to the dope flow direction when the cross-sectional area of a casting die is gradually decreased along the dope flow direction.

In the invention of claim 1, the orientation degree of irregularly shaped particles is improved by gradually decreasing the cross-sectional area at an extending portion. Further, the third invention is characterized by providing a manifold portion having this function.

However, since a casting die to manufacture a film has a smaller thickness and a larger width in the lip portion compared to the inlet potion, the casting die has a structure gradually expanding along the width direction. Accordingly, in the edge portion of the inlet of a land potion, the flow direction of the dope is inclined. Therefore, there has been a problem that the orientation directions of irregularly shaped particles in the central portion and the edge portion of the film are different even when the irregularly shaped particles are oriented along the flow direction of the dope.

As a result of study on this problem in the present invention, it was found that the flow direction becomes uniform both in the central portion and the edge portion by setting a land portion to be not less than 40 mm.

Further, it was found that the orientation degree is further improved as well as the layer thickness uniformity is improved, by setting a land portion to be not less than 40 mm.

Herein, the length of a land portion is preferably 40-200 mm, since there are a problem of increased pressure applied to a casting die and a problem of difficulty in manufacturing of a casting die when the length of the land portion is 200 mm or more.

In the present invention, the form of an extending portion is one in which the cross-sectional area of the plane perpendicular to the flow direction becomes narrower toward the downstream in the flow direction, and particularly is one in which the form of an extending portion has a constant width between the inlet portion and the outlet portion of the extending portion while the thickness is gradually narrowed from the inlet portion to the outlet portion of the extending portion. Further, the form of a cross-sectional plane includes a rectangular form and an elliptical form.

The optical film of the present invention is one manufactured by the above-described manufacturing method of optical film.

The polarizing plate protective film of the present invention is comprised of this optical film and contains at least one thermoplastic resin and irregularly shaped particles having anisotropy in polarized light scattering and an aspect ratio of 2-40, which is defined by the following equation. The mean orientation angle H of irregularly shaped particle is 0.5-40°.

Aspect ratio=absolute maximum length/diagonal width wherein a diagonal width means the minimum distance between two straight lines when the projected image of an irregularly shaped particle is sandwiched by two straight lines parallel to the absolute maximum length.

When the aspect ratio of irregularly shaped particles is less than 2, the orientation of the irregularly shaped particles is not enough, resulting in insufficient anisotropy in polarized light scattering, whereby no sufficient brightness improvement effect can be obtained. On the other hand, when the aspect ratio is over 40, irregularly shaped particles are apt to be broken off due to a shear force at the time of dispersion in a liquid or at the time of pumping of the melted substance, whereby no sufficient brightness improvement effect can be obtained.

When the mean orientation angle of irregularly shaped particles is less than 0.5°, the film tends to be torn along the longitudinal direction, resulting in difficulty in slitting the film edges in the manufacturing process. Further, prepared film exhibits a larger difference in mechanical strength and dimensional stability between the longitudinal direction and the width direction, whereby a defect of uneven brightness due to environmental change tends to occur, after the film is fabricated into a liquid crystal display.

On the other hand, when the orientation angle of irregularly shaped particles is over 40°, it is difficult to obtain a sufficient brightness improvement effect.

In the present invention, it was found that it is possible to provide a polarizing plate protective film exhibiting improved brightness, excellent productivity and excellent durability, by incorporating one or more types of thermoplastic resins and irregularly shaped particles, the irregularly shaped particles having an aspect ratio of 2.0 or more and having anisotropy in polarized light scattering, wherein the mean orientation angle of irregularly shaped particles is 0.5-40°, provided that the casting direction of polarizing plate protective film is designated as 0° and the film width direction is designated as 90°; and to provide a polarizing plate utilizing said polarizing plate protective film and a liquid crystal display device utilizing said polarizing plate.

Further, in the present invention, "irregularly shaped particles" means the particles which meet X≠Y and the aforesaid aspect ratio=Y/X is 2.0 or more, when the absolute maximum length of a particle is represented by Y and the diagonal width is represented by X. In the present invention, any types of particles except for spherical particles are applicable and utilized are such as tabular form particles, rod-like particles, elliptical form particles, needle form particles and string form particles.

In the following, examples of irregularly shaped particles utilized in the present invention will be listed, however, the present invention is not limited thereto.

Irregularly shaped particles include inorganic compound particles and organic compound particles.

Examples of inorganic compound particles include metal oxide such as silicone dioxide, titanium dioxide, aluminum oxide, zirconium oxide, kaolin, talc, clay, calcinated calcium silicate, calcium silicate hydrate, aluminum silicate, magnesium silicate and calcium phosphate; hydroxide, silicate, phosphate, carbonate, calcium silicate, potassium titanate, aluminum borate, basic magnesium sulfate and glass fiber.

Examples of organic compound particles include microparticles of such as silicone resin, fluorine resin and acrylic resin; and preferable is silicone resin and specifically preferable are those having a three-dimensional network structure. For example, listed are Tospearl 103, Tospearl Tospearl 105, Tospearl 108, Tospearl 120, Tospaerl 145, Tospearl 3120 and Tospeal 240 (manufactured by Toshiba Silicone Co., Ltd.).

Further, not less than two types of particles having different types (compositions) or forms may be utilized in combination.

Particles utilized in the present invention are preferably subjected to various surface treatments to improve affinity for cellulose ester resin.

Against particles which have been sufficiently dried, various types of surface modifiers such as a fatty acid type, an oil and fat type, a surfactant type, a wax type, a silane coupling agent, a titanate coupling agent, a carboxylic acid type coupling agent, a phosphoric acid type coupling agent and a polymer type can be utilized.

The treatment methods includes various methods such as a coating method in which the surface is covered by such as fatty acid, metal salt or a surfactant, a topochemical method in which a coupling agent is made to bond on the particle surface, in addition to a mechanochemical method in which an organic processing agent is added during the particle grinding process and a capsule method in which monomer is polymerized on the particle surface or the particle surface is covered with polymer by graft polymerization.

What kind of a modifier is utilized and how to treat the particle surface somewhat vary depending on the combination of a particle type and cellulose ester type resin, however, a coating treatment method by use of a fatty acid type modifier or a topochemical treatment method by various types of a silane coupling agents is preferable.

As a method to disperse particles, which have been subjected to the above-described surface treatment, in cellulose ester type resin; it is possible to restrain break of particles to be minimum and increase kneading ability by adopting a method in which extruder (13) equipped with one or two rotors is utilized, and resin is charged through the first hopper and particles being charged from the side of an extruder through the second hopper when the viscosity is decreased a certain degree. In the case of utilizing kneading method, resin is preferably cellulose acetate propionate.

By controlling orientation of particles by means of share stress application, stretching conditions thereafter and subjecting to magnetic field environment, there is an effect of increasing transmittance of a polarizing plate in a backlight (a so-called brightness improvement effect).

Irregularly shaped particles having optical anisotropy is irregularly shaped particles provided with an aspect ratio (a ratio of the absolute maximum length to the diagonal width), which is defined by the aforesaid equation, of not less than 2. Said aspect ratio is preferably not less than 2 and not more than 10,000, more preferably not less than 3 and not more than 1,000 and specifically preferably not less than 5 and not more than 100.

Irregularly shaped particles comprising plural types of forms or materials may be utilized by mixing with each other.

Evaluation of the orientation state and dispersion state of irregularly shaped particles in film can be determined by utilizing image data of irregularly shaped particles in film observed through an electron microscope.

A mean orientation angle and aspect ratio with respect to each irregularly shaped particle are determined based on image data. The aspect ratio can be determined by the aforesaid equation. Absolute maximum length corresponds to the length of the long axis (the long axis diameter).

Foreign matter or broken particles having an aspect ration of less than 2 are eliminated from calculation of a mean orientation angle and a mean inter-particle distance not to cause noise, and they are determined with respect to each particle having aspect ratio of not less than 2.

The mean orientation angle is determined from angles of the absolute maximum length of irregularly shaped particles against the standard axis. The standard axis is a transport direction at the time of film manufacturing. Orientation angles for each irregularly shaped particle are determined to calculate the average value.

A specific evaluation method will now be explained. Prepared film was pictured through an electron microscope at a magnification of 20,000, the images being read at 300 dpi and monochromic 256 gradation by use of a flat bed scanner, and the images having been read were taken into Image Analyzing Software WinROOF (manufactured by Mitsuya Shoji Co., Ltd.) having been installed on a personal computer.

With images having been taken in, image extraction of irregularly shaped particles was performed as a pre-processing of images by extraction (automatic binarization of images) with respect to a viewing range of 2×2 μm. Extraction of not less than 90% of irregularly shaped particles is confirmed on the image plane after image extraction of irregularly shaped particles, and manual adjustment is performed in the case of insufficient extraction to make detection and extraction of not less than 90% of particles.

In the case of the number of irregularly shaped particles in an observation range was less than 1,000, a similar operation was further performed with respect to other viewing ranges of 2×2 μm until the number of irregularly shaped particles reached to not less than 1,000 as a total.

In this manner, measurement of a mean orientation angle with respect to each irregularly shaped particle of image data having been subjected to an extraction processing was performed. A mean orientation angle of irregularly shaped particles will now be explained.

That is, an image of film having been photographed through an electron microscope and read by a scanner is formed. With respect to each irregularly shaped particle, orientation angles of the absolute maximum length (the long axis direction) against the standard axis, and mean value A=ave (a1-an) is calculated to be a mean orientation angle. As for the number of particles, not less than 1,000 were measured to calculate the average value.

A mean orientation angle of irregularly shaped particles is preferably 0.5-40°, more preferably 0.5-20° and specifically preferably 0.5-20°.

As a manufacturing method of polarizing plate protective film containing these irregularly shaped particles; kneaded pellets containing at least thermoplastic resin and irregularly shaped particles are prepared, successively said pellets together with thermoplastic resin or only kneaded pellets being charged into an extruder to be melting kneaded, and the melting kneaded substance is cast on a cooled drum from a casting die to form film; or thermoplastic resin and irregularly shaped particles are separately charged into an extrude to be melting kneaded, and the melting kneaded substance is cast on a cooled drum from a casting die, whereby polarizing plate protective film can be prepared.

In the following, irregularly shaped particles utilized in manufacturing of optical film of the present invention will be further explained.

A mass ratio of cellulose ester to irregularly shaped particles, which constitute polarizing plate protective film of the present invention, preferably satisfies the relation:

0<(irregularly shaped particles)/(cellulose ester)<20

It more preferably satisfies the relation:

0.001<(irregularly shaped particles)/(cellulose ester)<15

Herein, in the present invention, a refractive index of the above-described irregularly shaped particles is preferably in a range of 1.3-3.0.

It is preferable that said irregularly shaped particles are contained at not less than 0.1 volume % in polarizing plate protective film which is provided with an anisotropic polarized light and a polarizing plate protective function in a bodyering property and a brightness improvement function; and a preferable embodiment of the content differs depending on each case of the types and size of irregularly shaped particles, however, it is preferably not more than 5 volume % in the case of irregularly shaped particles having a refractive index of not less than 2.0 while it is preferably not more than 20 volume % in the case of irregularly shaped particles having a refractive index of not less than 1.3 and less than 2.0.

(Thermoplastic Resin)

Examples of a resin preferably used in the method of manufacturing an optical film of the present invention include: a cellulose ester resin having an acyl group substitution degree of 1.8 through 2.80 such as cellulose acetate, cellulose acetate propionate and cellulose acetate butylate; a cellulose ether resin having an alkyl group substitution degree of 2.0 through 2.80 such as cellulose methyl ether, cellulose ethyl ether and cellulose propyl ether; a cycloolefin resin; a norbornane resin; a polycarbonate resin; a polyamide resin as a polymer of an alkylene dicarboxylic acid and a diamine; a polymer of an alkylene dicarboxylic acid and a diol; a polymer of an alkylene diol and a dicarboxylic acid; a polymer of a cyclohexanedicarboxylic acid and a diol; a polymer of a cyclohexane diol and a dicarboxylic acid; a polyester resin such as a polymer of an aromatic dicarboxylic acid and a diol; a vinyl acetate resin such as a polyvinyl acetate and a vinyl acetate copolymer; a polyvinyl acetal resin such as polyvinyl acetal and polyvinyl butyral; an epoxy resin; a ketone resin; and a polyurethane resin such as a linear polymer of alkylene diisocyanate and an alkylene diol. At least one of the aforementioned substances is preferably contained.

Among them, a cellulose ester resin such as cellulose acetate, cellulose triacetate, cellulose acetate propionate and cellulose acetate butylate; a cycloolefin resin; a norbornane resin; and a polycarbonate resin are specifically preferred. Further, two or more compatible polymers can be blended and can be subjected to kneading of a melt which will be described later. However, the present invention is not limited thereto.

As other resin preferably used in the present invention, a homopolymer or a copolymer having an ethylenic unsaturated monomer unit can be cited. More preferably, a homopolymer or copolymer of an acrylate or methacrylate ester, such as polymethyl acrylate, polyethyl acrylate, polypropyl acrylate, polycyclohexyl acrylate, a copolymer of alkyl acrylates, polymethyl methacrylate, polyethyl methacrylate, poly cyclohexyl methacrylate, and a copolymer of alkyl methacrylates are cited. Further, since an ester of acrylic acid or methacrylic acid is excellent in transparency and compatibility, a homopolymer or a copolymer having an acrylate ester unit or a methacrylate ester unit, specifically, a homopolymer or a copolymer having a methyl acrylate unit or a methyl methacrylate unit is preferable. Concretely, polymethyl methacrylate is preferable. As an alicyclic alkyl ester of acrylic acid or of methacrylic acid such as polycyclohexyl acrylate or polycyclohexyl methacrylate, preferable is one having an advantage, for example, high heat resistance, low moisture absorbance and low birefringence.

The production method of the optical film of the present invention is a melt cast film forming method, which will be described in detail, below.

Hereafter, the present invention will be explained by using cellulose ester as an example.

In the present invention, a cellulose ester film is formed by carrying out a melt cast film forming method using a cellulose ester.

(Cellulose Ester)

A cellulose ester relating to the present invention, which includes at least one structure of an aliphatic acyl group and a substituted or unsubstituted aromatic acyl group, is a single- or mixed-acid ester of a cellulose.

In cases when an aromatic ring of the aromatic acyl group is a benzene ring, examples of a substituent for the benzene ring include a halogen atom, cyano, alkyl group, aryl group, aryloxy group, carbonamido group, sulfonamido group, ureido group, aralkyl group, nitro, alkoxycarbonyl group, aryloxycarbonyl group, aralkyloxycarbonyl group, carbamoyl group, sulfamoyl group, acyloxy group, alkenyl group, alkynyl group, alkylsulfonyl group, arylsulfonyl group, alkyloxysulfonyl group, aryloxysulfonyl group, alkylsulfonyloxy group, and aryloxysulfonyl group, —S—R, —NH—CO—OR, —PH—R, —P(—R)$_2$, —PH—O—R, —P(—R)(—O—R), —P(–O—R)$_2$, —PH(=O)—R—P(=O) (—R)$_2$, —PH(=O)—O—R, —P(=O) (—R) (—O—R), —P(=O)(—O—R)$_2$, —O—PH(=O)—R, —O—PH(=O)(—R)$_2$ —O—PH(=O)—O—R, —O—P(=O)(—R)(—O—R), —O—P(=O)(—O—R)$_2$, —NH—PH(=O)—R, —NH—P(=O)(—R) (—O—R), —NH—P(=O) (—O—R)$_2$, —SiH$_2$—R, —SiH(—R)$_2$, —Si(—R)$_3$, —O—SiH$_2$—R, —O—SiH(—R)$_2$ and —O—Si(—R)$_3$. In the foregoing, "R" is an aliphatic group, an aromatic group or a heterocyclic group.

The number of substituents is preferably from 1 to 5, more preferably from 1 to 4, still more preferably from 1 to 3, and further still more preferably 1 or 2.

Of these substituents, a halogen atom, cyano, alkyl group, alkoxy group, aryl group, aryloxy group, acyl group, carbonamido group, sulfonamido group and ureido are preferred; a halogen atom, cyano, alkyl group, alkoxy group, aryloxy group, acyl group and carbonamido group are more preferred; a halogen atom, cyano, alkyl group, and aryloxy group are still more preferred; and a halogen atom, alkyl group and alkoxy group are most preferred.

The foregoing halogen atom includes a fluorine atom, chlorine atom, bromine atom and iodine atom. The alkyl group may be a cyclic structure or branched. The number of carbon atoms of the alkyl group is preferably from 1 to 20, more preferably from 1 to 12, still more preferably from 1 to 6; and most preferably from 1 to 4. Specific examples of the alkyl group include methyl, ethyl, propyl, isopropyl, butyl, t-butyl, hexyl, cyclohexyl, octyl and 2-ethylhexyl. The alkoxyl group may be a cyclic structure or branched. The number of carbon atoms of the alkoxyl group is preferably from 1 to 20, more preferably from 1 to 12, still more preferably from 1 to 6, and most preferably from 1 to 4.

The alkoxy group may further be substituted by another alkoxy group. Specific examples of the alkoxy group include methoxy, ethoxy, 2-methoxyethoxy, 2-methoxy-2-ethoxyethoxy, butyloxy, hexyloxy and octyloxy.

The number of carbon atoms of the aryl group is preferably from 6 to 20, and more preferably from 6 to 12. Specific examples of the aryl group include phenyl and naphthyl. The number of carbon atoms of the aryloxy group is preferably from 6 to 20, and more preferably from 6 to 12. Specific examples of the aryloxy group include phenoxy and naphthoxy. The number of carbon atoms of the acyl group is preferably from 1 to 20, and more preferably from 1 to 12. Specific examples of the acyl group include formyl, acetyl and benzoyl. The number of carbon atoms of the carbonamido group is preferably from 1 to 20, and more preferably from 1 to 12. Specific examples of the carbonamido group include acetamido and benzamido. The number of carbon atoms of the sulfonamido group is preferably from 1 to 20, and more preferably from 1 to 12. Specific examples of the sulfonamido group methanesulfonamido, benzenesulfonamido and p-toluenesulfonamido. The number of carbon atoms of the ureido group is preferably from 1 to 20, and more preferably from 1 to 12. Specific examples of the ureido group include (unsubstituted) ureido.

The number of carbon atoms of the aralkyl group is preferably from 7 to 20, and more preferably from 7 to 12. Specific examples of the aralkyl group include benzyl, phenethyl and naphthylmethyl. The number of carbon atoms of the alkoxycarbonyl group is preferably from 1 to 20, and more preferably from 2 to 12. Specific examples of the alkoxycarbonyl group include methoxycarbonyl. The number of carbon atoms of the aryloxycarbonyl group is preferably from 7 to 20, and more preferably from 7 to 12. Specific examples of the aryloxycarbonyl group include phenoxycarbonyl. The number of carbon atoms of the aralkyloxycarbonyl group is preferably from 81 to 20, and more preferably from 8 to 12. Specific examples of the aralkyloxycarbonyl group include benzyloxycarbonyl. The number of carbon atoms of the carbamoyl group is preferably from 1 to 20, and more preferably from 1 to 12. Specific examples of the carbamoyl group include (unsubstituted) carbamoyl and N-methylcarbamoyl. The number of carbon atoms of the sulfamoyl group is preferably not more than 20, and more preferably not more than 12. Specific examples of the sulfamoyl group include (unsubstituted) sulfamoyl, and N-methylsulfamoyl. The number of carbon atoms of the acyloxy group is preferably from 1 to 20, and more preferably from 2 to 12. Specific examples of the acyloxy group include acetoxy and benzoyloxy.

The number of carbon atoms of the alkenyl group is preferably from 2 to 20, and more preferably from 2 to 12. Specific examples of the alkenyl group include vinyl, allyl and isopropenyl. The number of carbon atoms of the alkynyl group is preferably from 2 to 20, and more preferably from 2 to 12. Specific examples of the alkynyl group thienyl. The number of carbon atoms of the alkylsulfonyl group is preferably from 1 to 20, and more preferably from 1 to 12. The number of carbon atoms of the alkyloxysulfonyl group is preferably from 1 to 20, and more preferably from 1 to 12. The number of carbon atoms of the aryloxysulfonyl group is preferably from 6 to 20, and more preferably from 6 to 12. The number of carbon atoms of the alkylsulfonyloxy group is preferably from 1 to 20, and more preferably from 1 to 12. The number of carbon atoms of the aryloxysulfonyl group is preferably from 6 to 20, and more preferably from 6 to 12.

In cases when the cellulose ester relating to the present invention is an aliphatic acid ester of an aliphatic acyl group substituted for the hydroxylic hydrogen atom of a cellulose, the aliphatic acyl group has 2-20 carbon atoms and specific examples thereof include acetyl, propionyl, butyryl, isobutyryl, valeryl, pivaloyl hexanoyl, octanoyl, lauroyl and stearoyl.

The foregoing aliphatic acyl group includes substituted one and examples of a substituent include ones exemplified as a substituent for a benzene ring when the aromatic ring is a benzene ring.

In cases when an esterified substituent of the foregoing cellulose ester is an aromatic ring, the number of substituents substituted for the aromatic ring is 0 or 1-5, preferably 1-3, and more preferably 1 or 2. When the number of substituents substituted for the aromatic ring is 2 or more, such substituents may be the same or different, and may form a condensed polycyclic compound (e.g., naphthalene, indene, indane, phenanthrene, quinoline, isoquinoline, chromene, phthalazine, acridine, indole, indoline).

The cellulose ester relating to the present invention has at least one structure selected from a substituted or unsubstituted aliphatic acyl group and a substituted or unsubstituted aromatic acyl group, which may be a single- or mixed-acid ester of a cellulose, or may be a mixture of at least two cellulose esters.

The cellulose ester relating to the present invention is preferably at least one selected from cellulose acetate, cellulose propionate, cellulose butyrate, cellulose acetate propionate, cellulose acetate butyrate, cellulose acetate phthalate and cellulose phthalate.

With regard to the degree of substitution of a mixed acid ester, a lower fatty acid ester or more preferable cellulose acetate propionate or cellulose acetate butyrate contains an acyl group of 2-4 carbon atoms as a substituent and there is preferred a cellulose resin containing a cellulose ester simultaneously satisfying the following equations (I) and (II) in which X represents the degree of substitution of an acetyl group and Y represents the degree of a propionyl group or butyryl group. The degree of substitution of the acetyl group and that of the other group are each determined in accordance with ASTM-D817-96.

$$2.5 \leq X+Y \leq 2.9 \quad \text{Equation (I)}$$

$$0.1 \leq X \leq 2.0 \quad \text{Equation (II)}$$

Of these, cellulose acetate propionate is preferred and it is specifically preferred that $1.0 \leq X \leq 2.5$ and $0.5 \leq Y \leq 2.5$. There may be blended cellulose esters differing in their degree of substitution so that the overall optical film falls within the foregoing range. The portion which is not substituted by the acyl group usually exists as a hydroxyl group. These can be synthesized by commonly known methods. The degree of substitution of an acetyl group can be determined in accordance with ASTM-D817-96.

The number average molecular weight of a cellulose ester used for the optical film of the present invention falls preferably within the range of 60000 to 300000, resulting in enhanced mechanical strength of the film, and the range of 70000 to 200000 is more preferred.

A cellulose ester used in the present invention preferably exhibits a ratio of weight average molecular weight Mw/number average molecular weight Mn of from 1.5 to 5.5, more preferably from 2.0 to 5.0, still more preferably from 2.5 to 5.0, and further still more preferably 3.0 to 5.0.

Determination of weight average molecular weight can be conducted in the following manner.
(Method of Determination of Molecular Weight)

The molecular weight is determined by using a high-speed liquid chromatography (gel permeation chromatography GPC).

Measurement conditions are as follows:
Apparatus: HLC-8220 GPC (produced by TOSO)
Column: TSK-SUPER HM-M (φ 6.0 mm×150 mm)
  TSK-Guardcolumn H-H (φ4.6 mm×35 mm)
Solvent: tetrahydrofuran
Flow rate: 0.6 ml/min
Temperature: 40° C.
Sample concentration: 0.1% by mass
Calibration curve: standard polystyrene STK There was used a calibration curve prepared by 13 samples of standard polystyrene (produced by TOSO), having Mw=1000000-500. The 13 samples were used approximately at equivalent intervals.

Cellulose as raw material for a cellulose ester used in the present invention may be various kinds of wood pulp or cotton linter and wood pulp may be either from needle trees or leaf trees, but needle trees are preferred. Cotton linter is preferably used in term of peelability at the time film formation. Cellulose esters made from these may be optimally mixed or singly used.

There is usable a ratio of cellulose ester originating in cotton linter: cellulose ester origination wood pulp (needle tree): cellulose ester originating in wood pulp (leaf tree of, for example,
100:0:0
90:10:0
85:15:0
50:50:0
20:80:0
10:90:0
0:100:0
0:0:100
80:10:10
85:0:15 or
40:30:30.

The limiting viscosity of a cellulose ester is preferably in the range of from 1.5 to 1.75 g/cm$^3$, and more preferably from 1.53 to 1.63.

A cellulose ester used in the present invention preferably is a film which exhibits less foreign matter luminescence.

The foreign matter luminescence is brightening spots of light coming out of a light source when a cellulose ester film is disposed between two perpendicularly disposed polarizing plates (cross Nicol), illuminated by a light source from one side and observed from the other side. Polarizing plates used for evaluation are desirably ones which are constituted of a protective film having no foreign matter luminescence and ones using a glass plate for protection of the polarizing plates.

One of the causes for the foreign matter luminescence is assumed to be due to non-esterified or low-esterified cellulose, so that foreign matter luminescence can be removed by using a cellulose ester of reduced foreign matter luminescence (or using a cellulose ester exhibiting a low dispersion in degree of substitution) and by filtering a melted cellulose ester or passing it through a filtration step in at least either the latter stage of cellulose ester synthesis or in the stage of obtaining precipitates. Since a melted resin exhibits a high viscosity, the latter method is efficient.

There are tendencies that thinner film results in fewer number of foreign matter luminescence spots per unit area and a lower cellulose ester content of the film forms less foreign matter luminescence. The number of foreign matter luminescence spots having a spot diameter of 0.01 mm or more is preferably not more than 200 spots/cm$^2$, more preferably not more than 100 spots/cm$^2$, still more preferably not more than 50 spots/cm$^2$, and further still more preferably not more than 30 spots/cm$^2$, and yet further still more preferably not more than 10 spots/cm$^2$. The number of foreign matter luminescence spots having a spot diameter of 0.005 to 0.01 mm is also preferably not more than 200 spots/cm$^2$, more preferably not more than 100 spots/cm$^2$, still more preferably not more than 50 spots/cm$^2$, and further still more preferably not more than 30 spots/cm$^2$, and yet further still more preferably not more than 10 spots/cm$^2$, while none is most preferred.

When removing foreign matter luminescence through melt filtration, filtering a cellulose composition mixed with additives such as a plasticizer, an antidegradation agent, an antioxidant and the like is preferred in terms of enhanced efficiency for removing foreign matter luminescence rather than filtering a melt of a cellulose ester alone. Reduction can also be achieved through solution in a solvent and filtration in the process of synthesis.

A melt of a cellulose ester is filtered preferably at a viscosity of not more than 10000 P, more preferably not more than 7000 P.

There are preferably used, as a filtering material, commonly known materials such as glass fibers, cellulose fibers, filtration paper and a fluororesin, e.g., tetrafluoroethylene resin. Specifically, ceramics and metals are preferably used. The absolute filtration precision of a filter is preferably not more than 50 μm, more preferably not more than 30 μm, still more preferably not more than 10 μm, and further still more preferably not more than 5 μm. These are optimally combined. A filter material may be the surface type or the depth type one but the depth type is preferred in terms of being reduced tendency to clog.

(Plasticizer)

The optical film of the present invention preferably contains an ester compound as a plasticizer, having a structure of condensation of an organic acid represented by Formula (1) and a tri- or more-valent alcohol in an amount of 1 to 25% by mass as a plasticizer. Any effect of including the plasticizer is not noticed in an amount of less than 1% by mass. An amount of more than 25% by mass, which tends to cause bleed-out and results in reduced aging stability of the film, is not preferred. More preferably, the optical film contains the foregoing plasticizer in an amount of 3 to 20% by mass and still more preferably in an amount of 5 to 15% by mass.

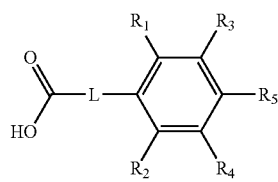

Formula (1)

A plasticizer is in general an additive which is effective for improvement of brittleness or providing flexibility when added to a polymer. In the present invention, addition of a plasticizer results in a lower melting temperature than that of the cellulose ester alone, and at the same temperature, the melt viscosity of the film composition containing a plasticizer is lower than that of the cellulose ester alone. Further, addition achieves enhanced hydrophilicity of cellulose ester so that water vapor permeability of cellulose ester films is lowered, therefore, the plasticizer functions as a agent for preventing moisture permeation.

The melting temperature of the film composition refers to the temperature at which the heated materials exhibit a state of fluidity. In order that a cellulose ester results in melt fluidity, it is necessary to heat the cellulose ester to a temperature which is at least higher than the glass transition temperature. At or above the glass transition temperature, the elastic modulus or viscosity decreases due to heat absorption, whereby fluidity comes into effect. However, at a higher temperature, cellulose ester melts and simultaneously undergoes thermal degradation to result in a decrease in the molecular weight of the cellulose ester, whereby the dynamic characteristics of the resulting film may be adversely affected. Consequently, it is preferable to melt cellulose ester at as low a temperature as possible. Lowering the melting temperature of the film forming materials is achieved by the addition of a plasticizer having a melting point or a glass transition temperature which is equal to or lower than the glass transition temperature of the cellulose ester. The polyvalent alcohol ester plasticizer having a condensation structure of an organic acid represented by the foregoing Formula (1) and a polyvalent alcohol lowers the melting temperature of a cellulose ester and exhibits reduced volatility in the melt film formation process or after production, which is superior in process suitability and results in an optical film superior in an optical characteristic, dimensional stability and flatness.

In the Formula (1), $R_1$-$R_5$ are each a hydrogen atom, a cycloalkyl group, an aralkyl group, an alkoxy group, a cycloalkyl group, an aryloxy group, an aralkyloxy group, an acyl group, a carbonyloxy group, an oxycarbonyl group, and an oxycarbonyloxy group, and these groups may be sub $R_1$-$R_5$ is not a hydrogen atom. L represents a divalent linkage group, including a substituted or unsubstituted alkylene group, an oxygen atom, or a single bond.

The cycloalkyl group represented by $R_1$-$R_5$ is preferably a cycloalkyl group having 3-8 carbon atoms and specific examples thereof include cyclopropyl, cyclopentyl, and cyclohexyl. These groups may be substituted and examples of a preferred substituent include a halogen atom, such as a chlorine atom, a bromine atom, a fluorine atom, a hydroxyl group, an alkyl group, an alkoxy group, a cycloalkoxy group, an aralkyl group (a phenyl group of which may be substituted by an alkyl group, a halogen atom or the like), an alkenyl group such as a vinyl group or an allyl group, a phenyl group (a phenyl group of which may be substituted by an alkyl group, a halogen atom or the like), a phenoxy group (a phenyl group of which may be substituted by an alkyl group, a halogen atom or the like), an acyl group having 2-8 carbon atoms such as an acetyl or propionyl group, and an unsubstituted carbonyloxy group having 2-8 carbon atoms, such as an acetyloxy or propionyloxy group.

The aralkyl group represented by $R_1$-$R_5$ includes, for example, a benzyl group, a phenethyl group and a γ-phenylpropyl group, which may be substituted, and preferred substituents are the same as cited in the foregoing cycloalkyl group.

The alkoxy group represented by $R_1$-$R_5$ includes an alkoxy group having 1-8 carbon atoms. Specific examples thereof include alkoxy groups such as methoxy, ethoxy, n-propoxy, n-butoxy, n-octyloxy, isopropoxy, isobutoxy, 2-ethylhexyloxy, and t-butoxy. These groups may be substituted and examples of a preferred substituent include a halogen atom such as a chlorine atom, bromine atom or a fluorine atom, a hydroxy group, an alkoxy group, a cycloalkoxy group, an aralkyl group (in which a phenyl group may be substituted by an alkyl group or a halogen atom), an alkenyl group, a phenyl group (which may be substituted by an alkyl group, a halogen atom or the like), an aryloxy group [for example, a phenoxy group (in which a phenyl group may be substituted by an alkyl group or a halogen atom)], an acyl group such as an acetyl group or a propionyl group, an unsubstituted acyloxy group having 2-8 carbon atoms, such as acetyloxy group or a propionyloxy group, and an arylcarbonyloxy group such as benzoyloxy group.

The cycloalkoxy group represented by $R_1$-$R_5$ includes an unsubstituted cycloalkoxy group having 1-8 carbon atoms, and specific examples thereof include cyclopropyloxy, cyclopentyloxy and cyclohexyloxy. These groups may be substituted and preferred substituents are the same as cited in the foregoing cycloalkyl group.

The aryloxy group represented by $R_1$-$R_5$ includes a phenoxy group, in which a phenyl group may be substituted by a substituent such as an alkyl group or a halogen atom, as cited in the foregoing cycloalkyl group.

The aralkyloxy group represented by $R_1$-$R_5$ includes a benzyloxy group and a phenethyloxy group, which may be substituted by a substituent and preferred substituents are those as cited in the foregoing cycloalkyl group.

The acyl group represented by $R_1$-$R_5$ includes an unsubstituted acyl group such as an acetyl group or propionyl group (in which a hydrocarbon group of the acyl group include an alkyl group, an alkenyl group and an alkynyl group), which may be substituted by a substituent and preferred substituents are those as cited in the foregoing cycloalkyl group.

The carbonyloxy group represented by $R_1$-$R_5$ includes an unsubstituted an acyloxy group having 2-8 carbon atoms such as an acetyloxy group or propionyloxy group (in which a hydrocarbon group of the acyl group include an alkyl group, an alkenyl group and an alkynyl group) and an aryloxycarbonyl group such as benzoyloxy, which may be substituted by a substituent and preferred substituents are those as cited in the foregoing cycloalkyl group.

The oxycarbonyl group represented by $R_1$-$R_5$ includes an alkoxycarbonyl group such a methoxycarbonyl group, an ethoxycarbonyl group or a propyloxycarbonyl group, and an aryloxycarbonyl group such as a phenoxycarbonyl group, which may be substituted by a substituent and preferred substituents are those as cited in the foregoing cycloalkyl group.

The oxycarbonyloxy group represented by $R_1$-$R_5$ includes an alkoxycarbonyloxy group having 1-8 carbon atoms such as a methoxycarbonyloxy group, which may be substituted by a substituent and preferred substituents are those as cited in the foregoing cycloalkyl group.

At least one of these $R_1$-$R_5$ is not a hydrogen atom. Any ones of $R_1$-$R_5$ may combine with each other to form a ring.

The linkage group represented by L represents a substituted or unsubstituted alkylene group, an oxygen atom, or a single bond. The alkylene group includes a methylene group, an ethylene group and a propylene group, which may be substituted by the same substituents as cited in those for the group represented by $R_1$-$R_5$.

The linkage group represented by L preferably is a bond, which leads to an aromatic carboxylic acid.

The organic acid forming an ester compound as a plasticizer and represented by the Formula (1) is preferably one in which at least $R_1$ or $R_2$ is preferably the above-described alkoxy group, acyl group, oxycarbonyl group, carbonyloxy group or oxycarbonyloxy group. Further, a compound having plural substituents are also preferred.

In the present invention the organic acid which is substituted for hydroxyl groups of a tri- or more-valent alcohol may be a single acid or plural acids.

A tri- or more-valent alcohol which reacts with the foregoing organic acid represented by Formula (1) to form a polyvalent alcohol ester is preferably an aliphatic polyvalent alcohol having a valence of 3 to 20 and in the present invention, the tri- or more-valent alcohol is preferably represented by the following Formula (3):

$$R'-(OH)_m \qquad \text{Formula (3)}$$

Wherein R' is an m-valent organic group, m is a positive integer of 3 or more and OH is an alcoholic hydroxyl group. A polyvalent alcohol having m of 3 or 4 is specifically preferred.

Preferred examples of a polyvalent alcohol, to which the present invention is not limited, include adonitol, arabitol, 1,2,4-butanetriol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, 3-methylpentane-1,3,5-triol, pinacol, sorbitol, trimethylolpropane, trimethylolethane and xylitol. Of these, glycerin, trimethylethane, trimethylolpropane and pentaerythritol are preferred.

An ester formed of an organic acid represented by Formula (1) and a polyvalent alcohol having a valence of 3 or more can be synthesized according to commonly known methods. Although representative synthesis examples are shown in Examples, there are cited, for example, a method in which an organic acid represented by the Formula (1) and a polyvalent alcohol are condensed in the presence of an acid to form an ester; a method in which an organic acid is preliminarily transformed to an acid chloride or an acid anhydride, which is reacted with a polyvalent alcohol; and a method in which a phenyl ester of an organic acid and a polyvalent alcohol are reacted. It is preferred to choose an appropriate method exhibiting high yield according to the targeted ester compound.

A plasticizer of an ester formed of an organic acid represented by the Formula (1) and a polyvalent alcohol having a valence of 3 or more is preferably a compound represented by the following Formula (2):

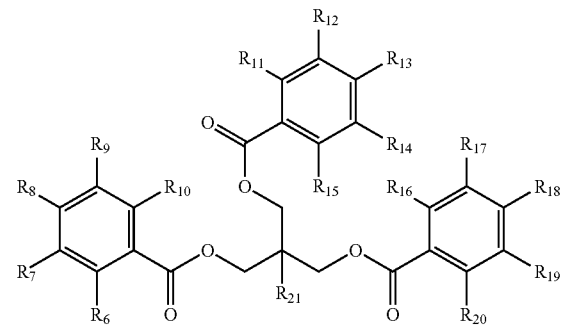

Formula (2)

wherein $R_6$ through $R_{20}$ are each a hydrogen atom, a cycloalkyl group an alkoxy group, an aralkyl group, a cycloalkoxy group, an aryloxy group, an aralkyloxy group, an acyl group, a carbonyloxy group and oxycarbonyloxy group, and these groups may be substituted by a substituent, provided that at least one of $R_6$ to $R_{10}$ is not a hydrogen atom, at least one of $R_{11}$ to $R_{15}$ is not a hydrogen atom and at least one of $R_{16}$ to $R_{20}$ is not a hydrogen atom; and $R_{21}$ is an alkyl group.

The cycloalkyl group, aralkyl group, alkoxy group, cycloalkoxy group, aryloxy group, aralkyloxy group, acyl group, carbonyloxy group and oxycarbonyloxy group of $R_6$ to $R_{21}$ area the same as cited in the foregoing $R_1$ to $R_5$.

The molecular weight of the thus obtained polyvalent alcohol ester is not specifically limited but preferably from 300 to 1500, and more preferably from 400 to 1000. A larger molecular weight, which is difficult to vaporize, is preferred and a smaller molecule is preferred in terms of moisture permeability and compatibility with a cellulose ester.

Specific examples of a polyvalent alcohol ester relating to the present invention are shown below.

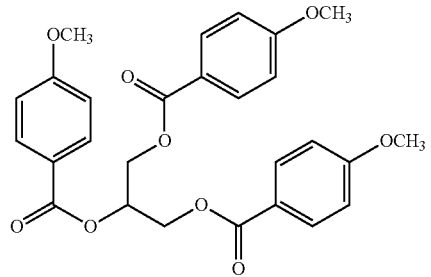
494.49
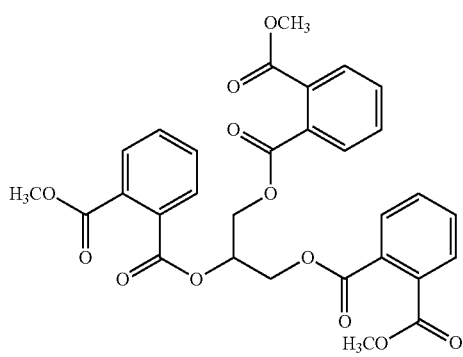
578.52
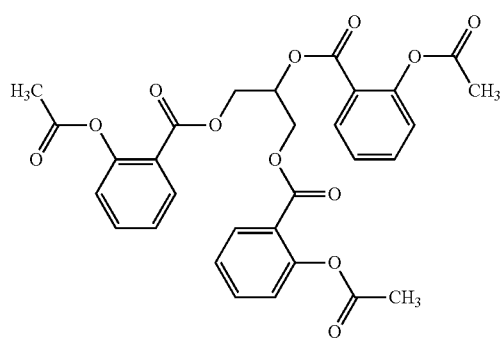
578.52
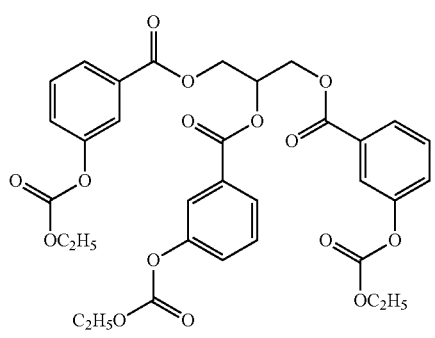
868.60
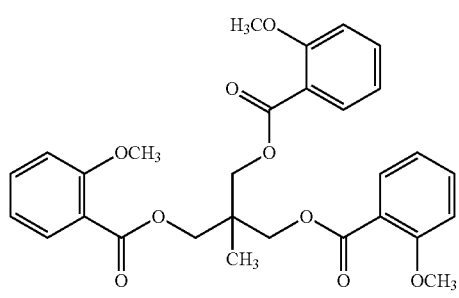
522.54
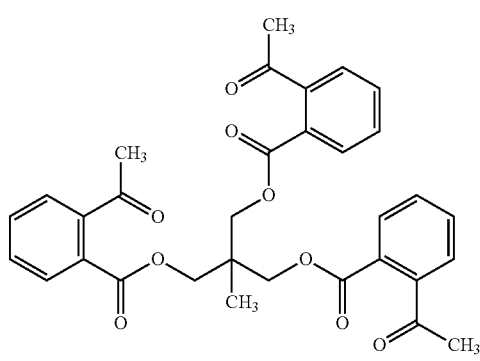
558.58
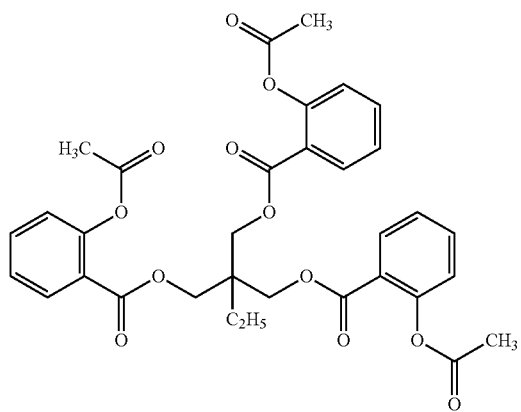
620.60
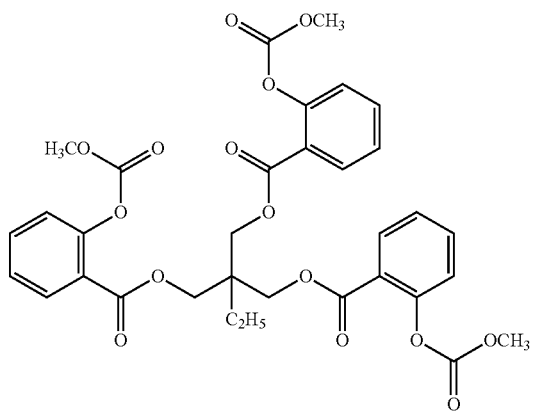
668.60

-continued
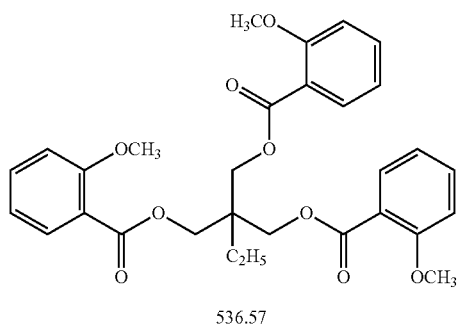
9
536.57
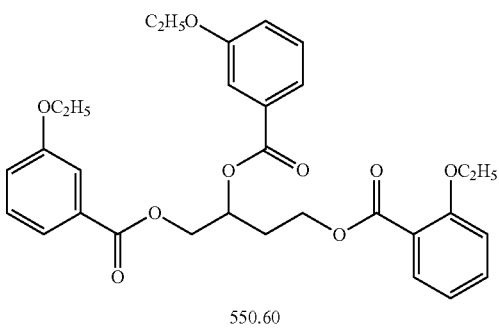
10
550.60
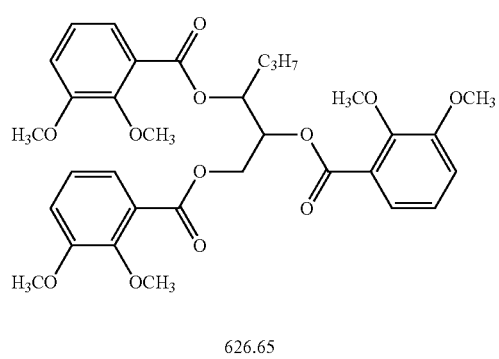
11
626.65
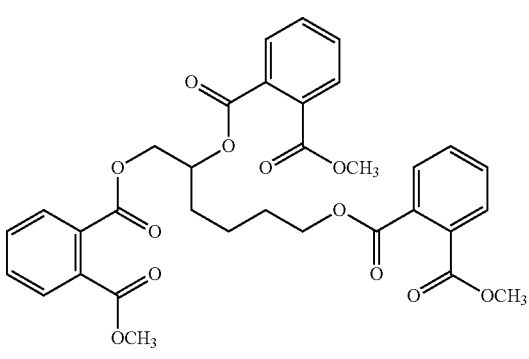
12
620.60
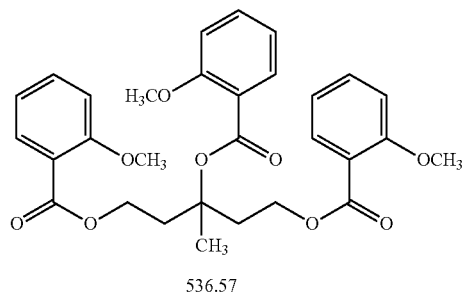
13
536.57
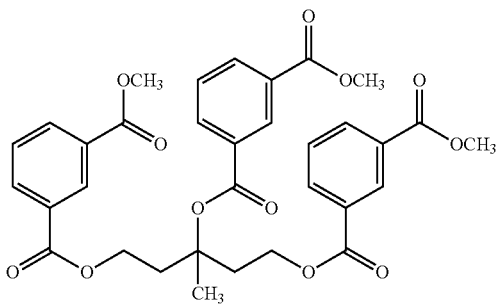
14
620.60
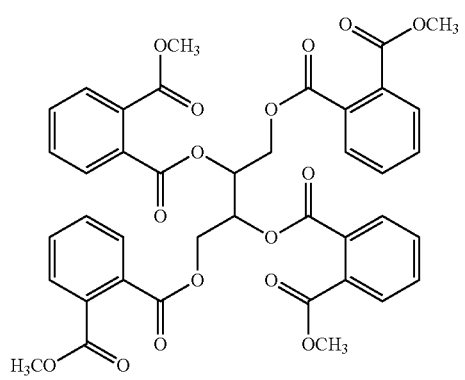
15
770.69
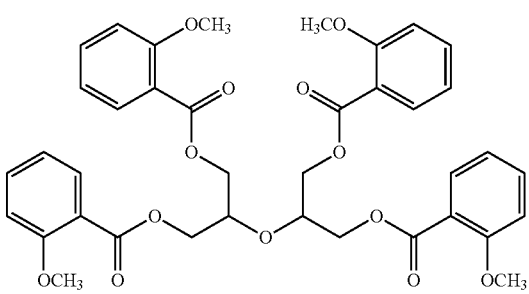
16
702.70

17
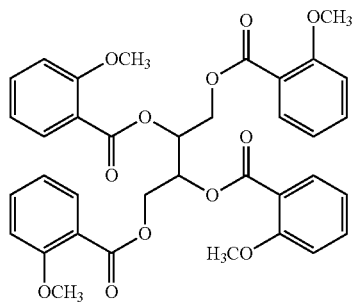
658.65
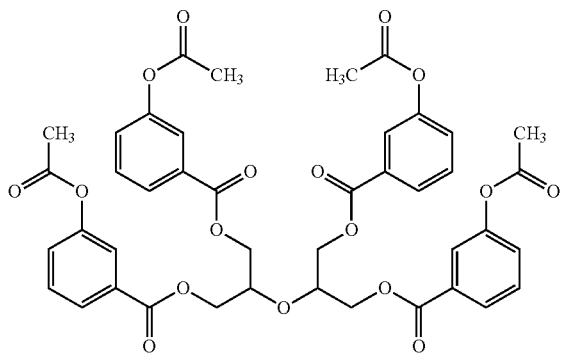
814.74
19
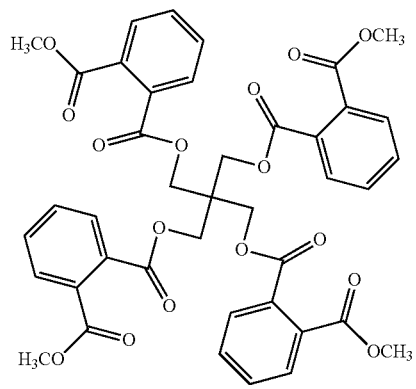
784.71
20
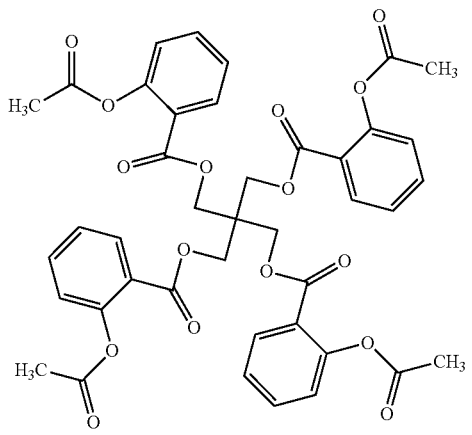
784.71
21
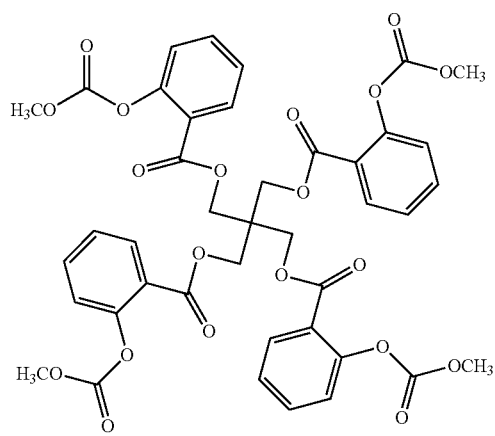
848.71
22
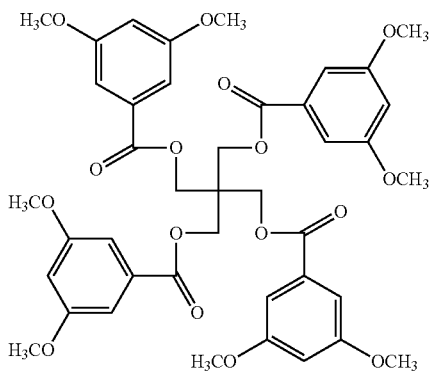
792.78

-continued
23
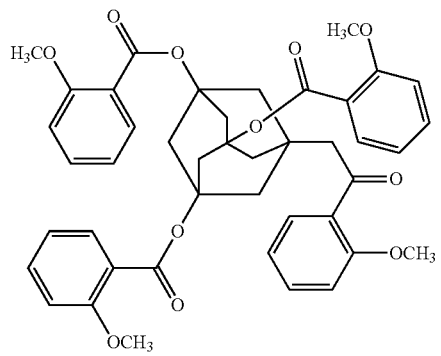
736.76
24
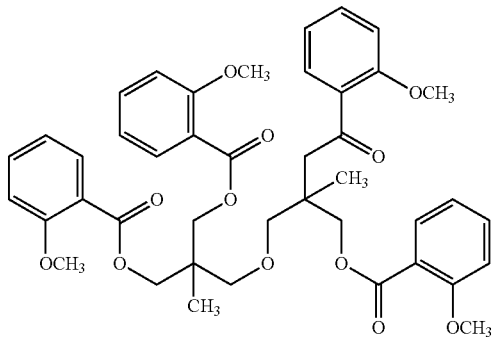
742.81
25
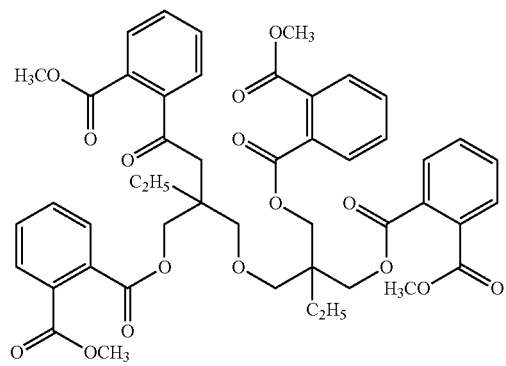
882.90
26
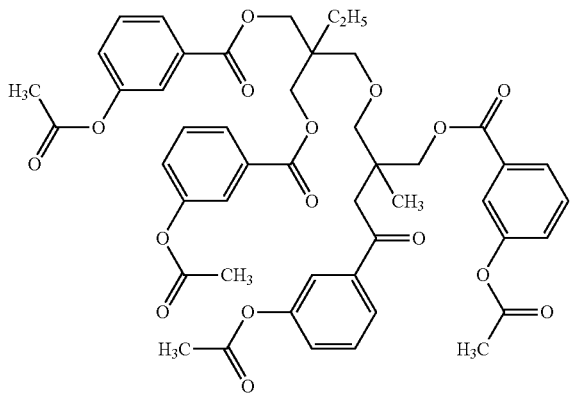
868.87
27
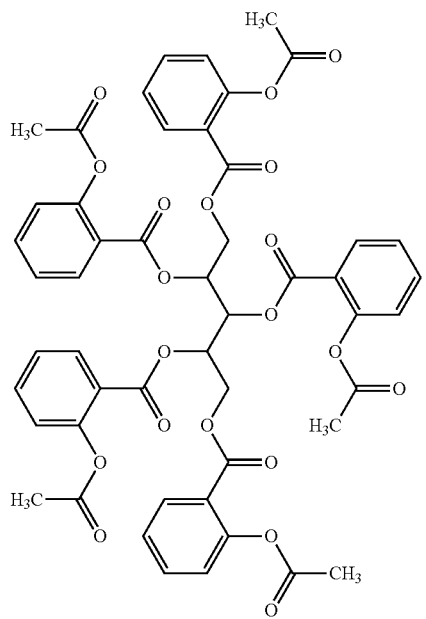
862.88
28
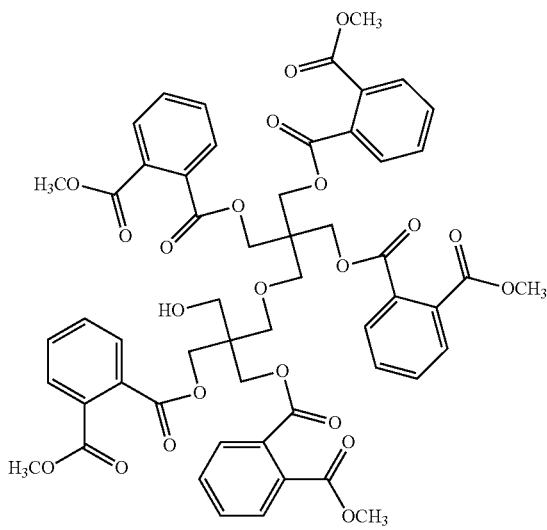
1064.99

29
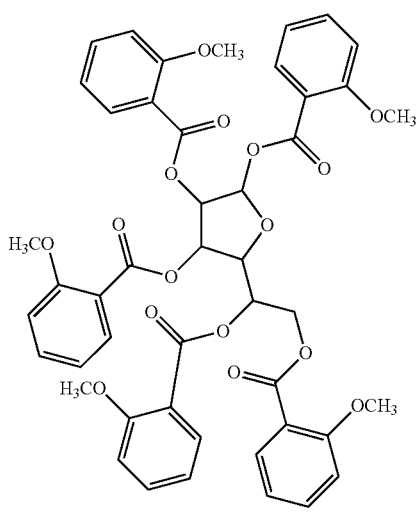
850.82
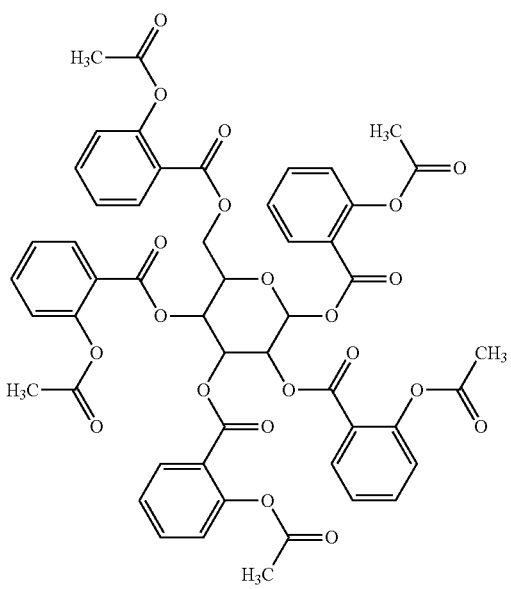
990.87
31
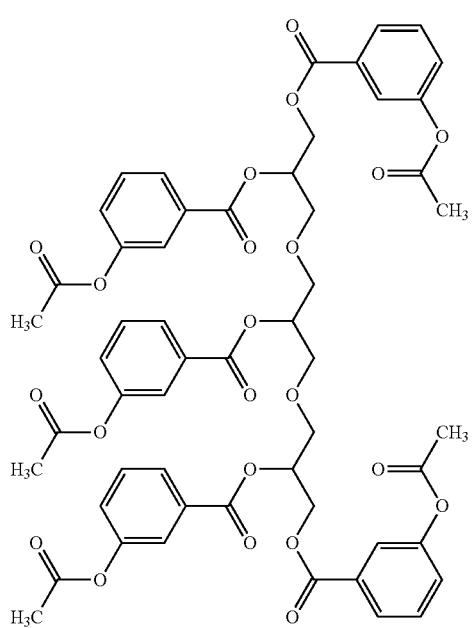
1050.86
32
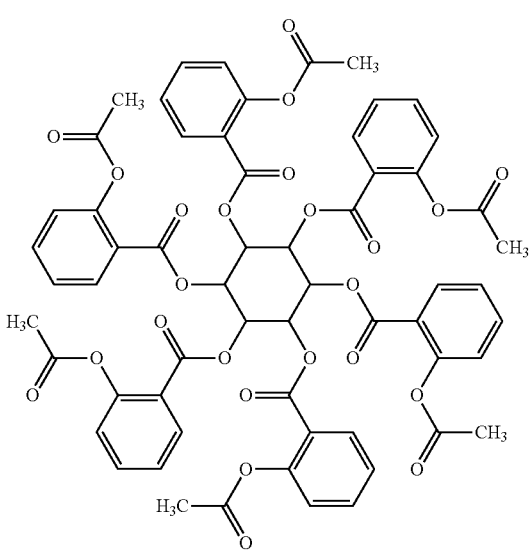
1153.01

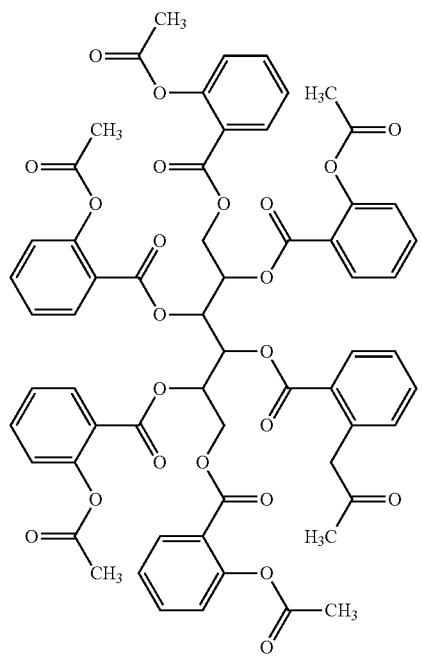
33
1155.02
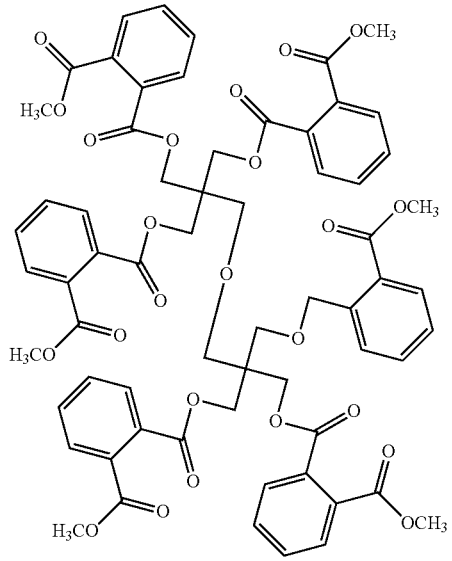
34
1213.15
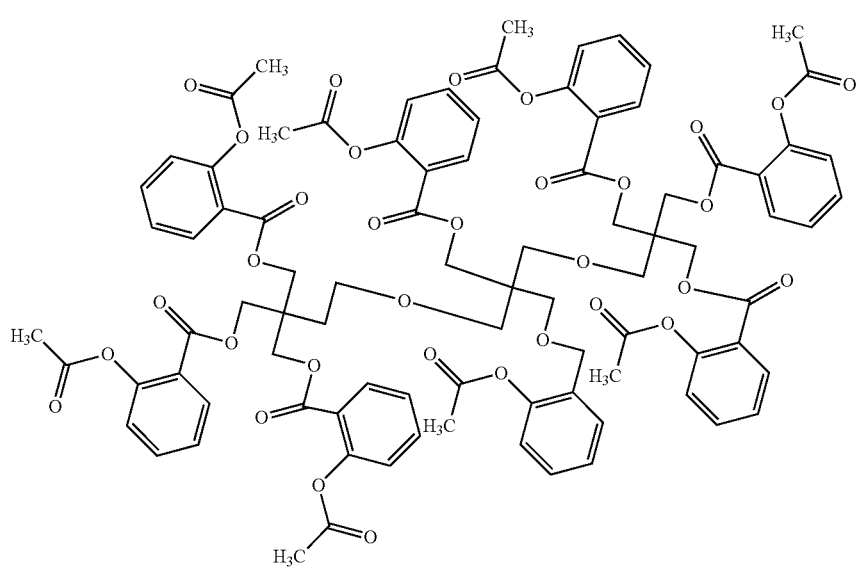
35
1669.69

36
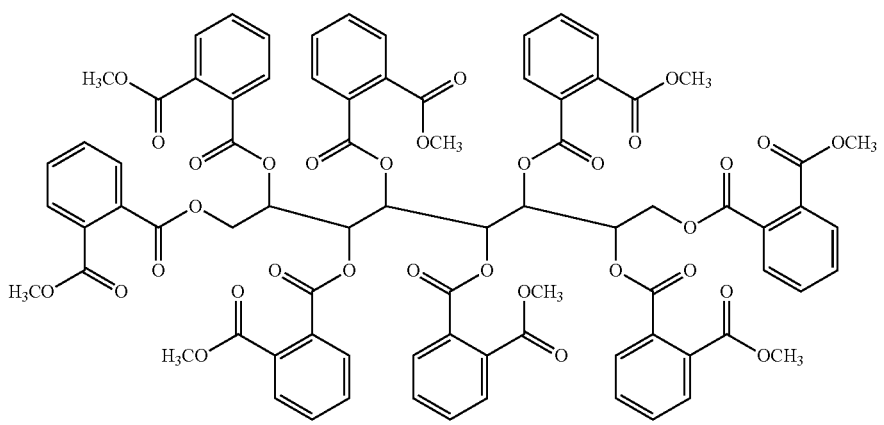
1539.38
37
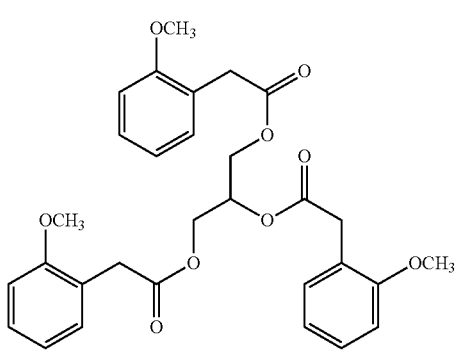
536.57
38
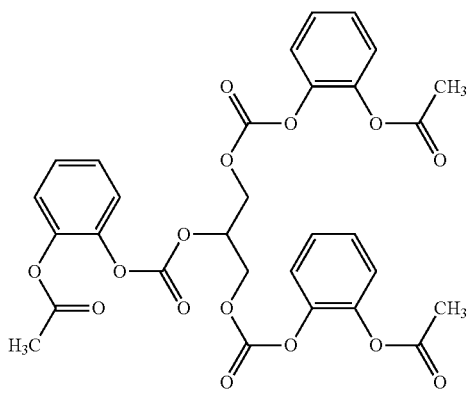
626.52
39
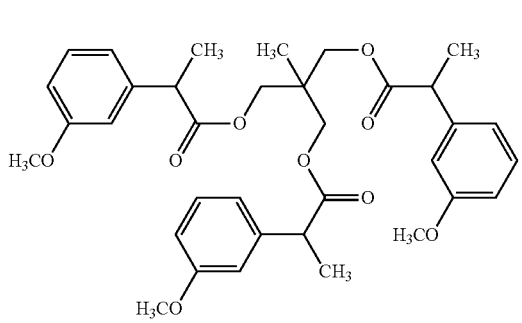
606.70
40
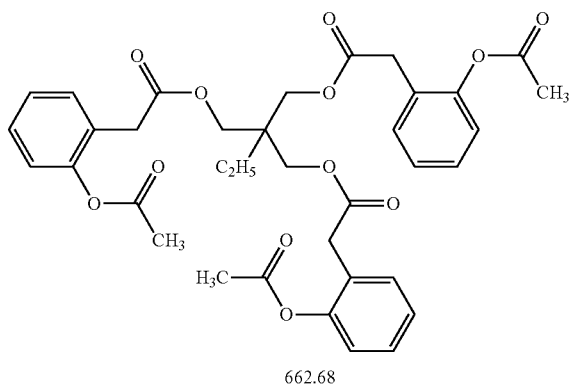
662.68

-continued
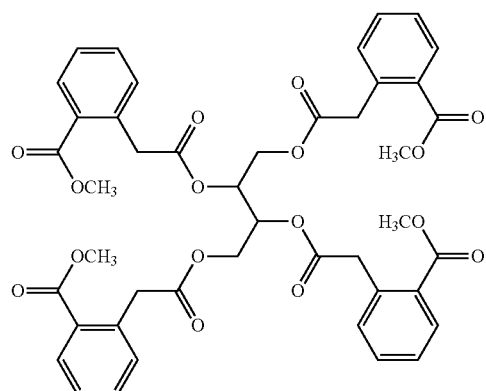
826.79
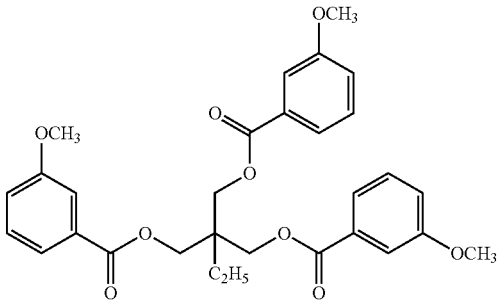
536.57
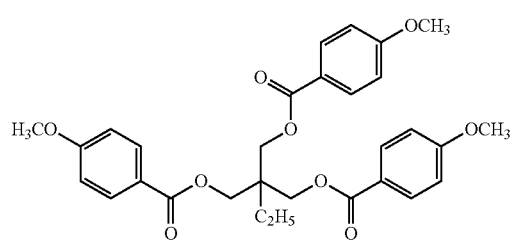
538.57
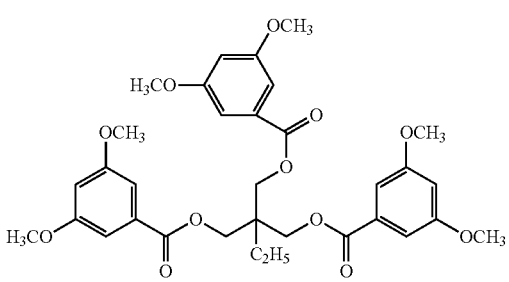
626.65
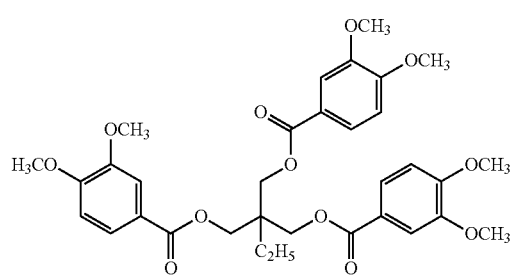
626.65
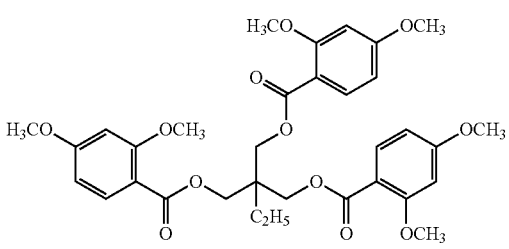
626.65
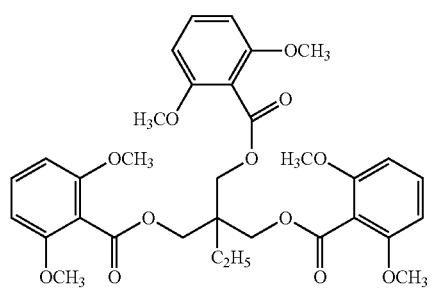
626.65
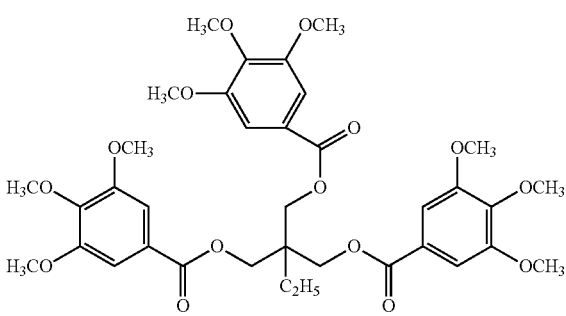
716.73

-continued
49
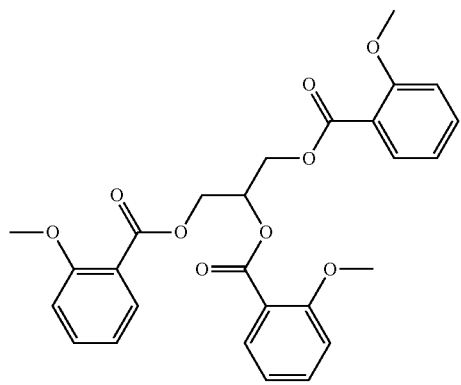
494.49
50
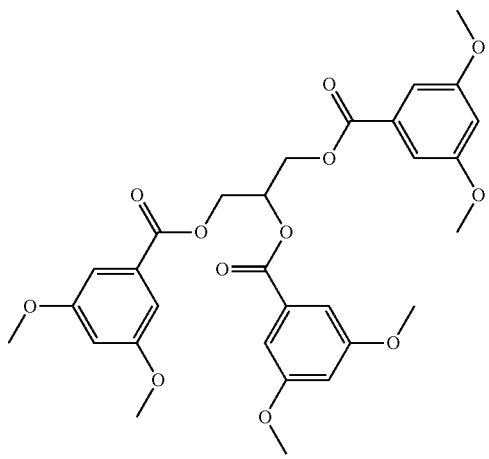
584.57
51
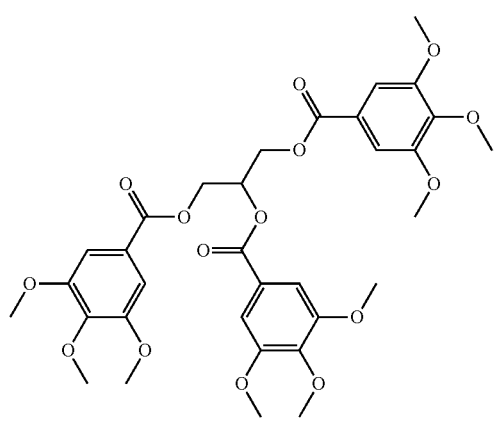
674.65
52
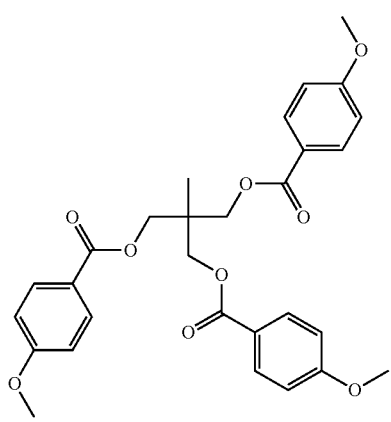
522.64
53
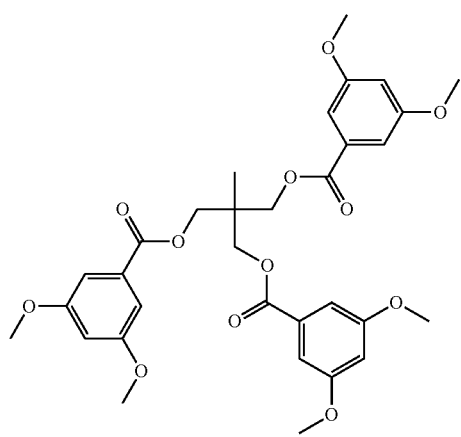
612.62
54
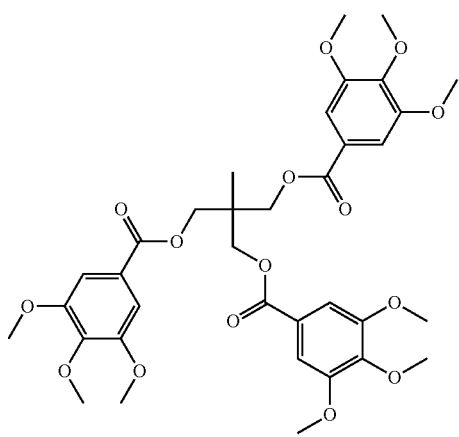
702.70

-continued
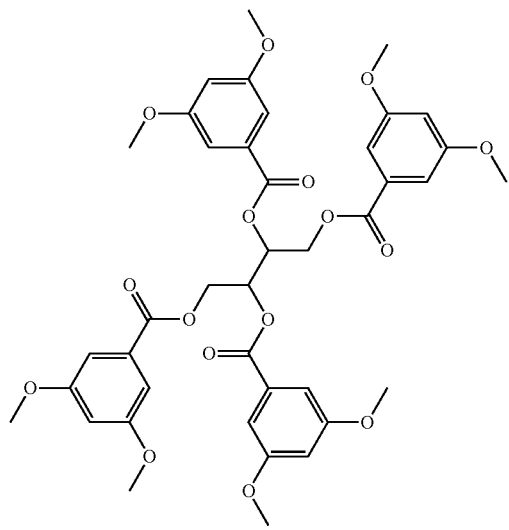
55
778.75
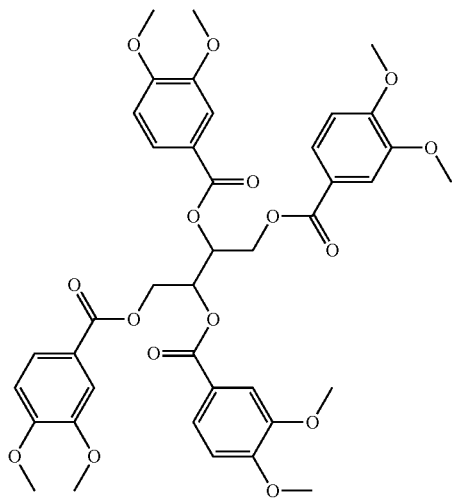
56
778.75
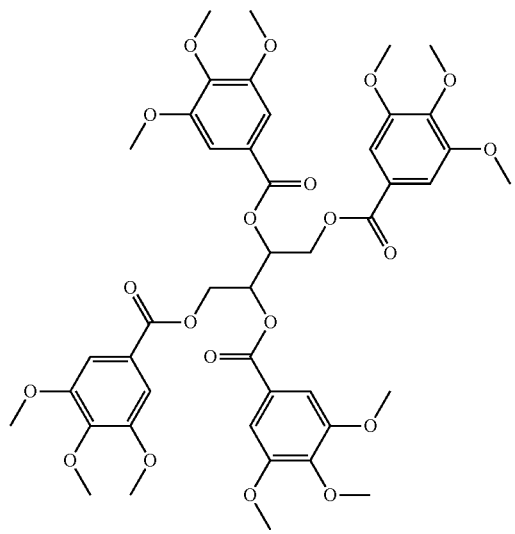
57
898.86
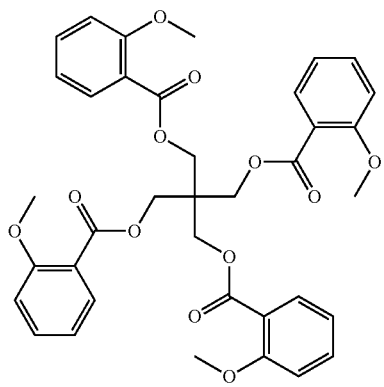
58
672.67

59
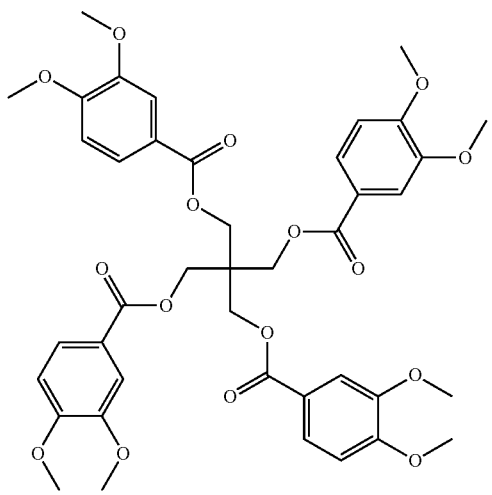
792.78
60
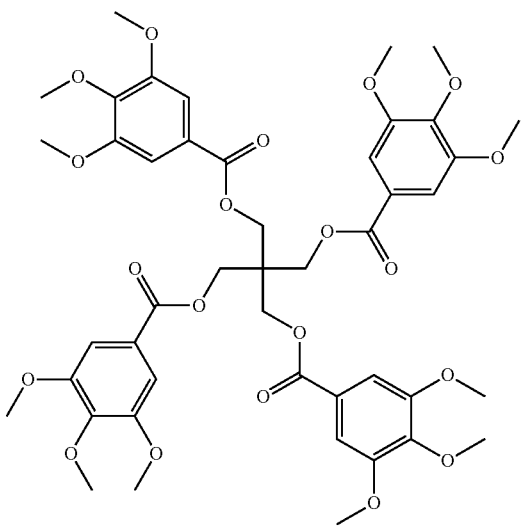
912.88
COMPOUND 3
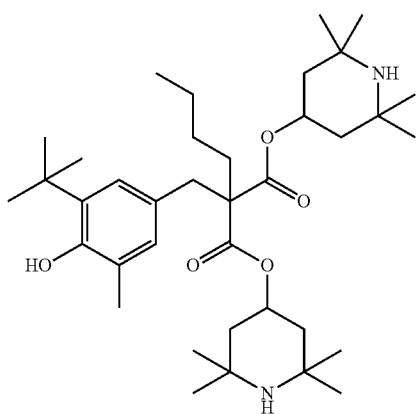
COMPOUND 19
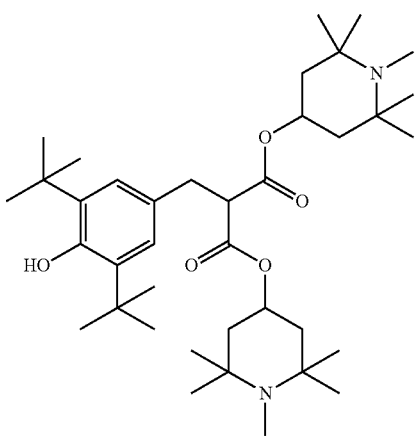
COMPOUND 2
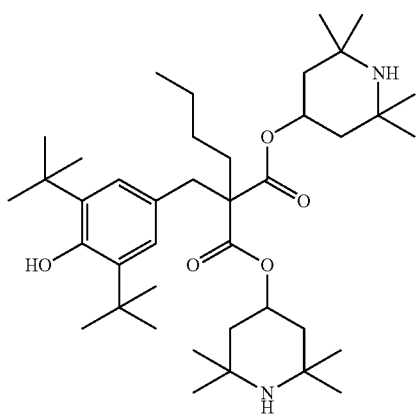
COMPOUND 6
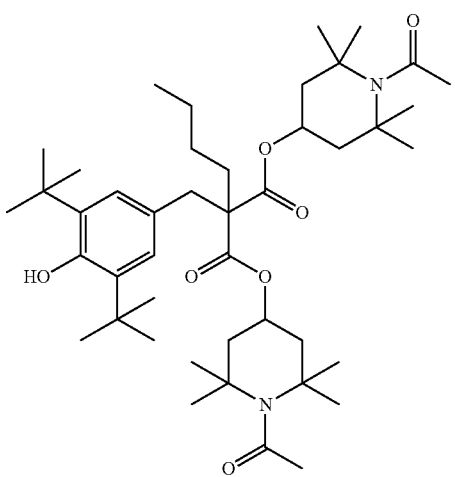

-continued
COMPOUND 12
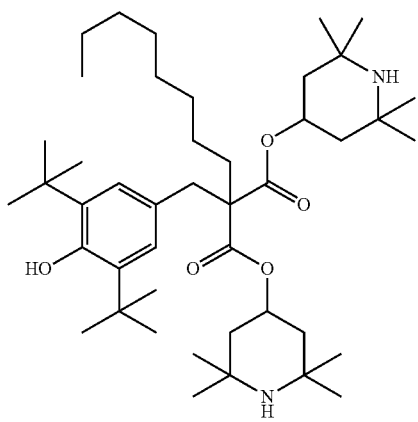
COMPOUND 14
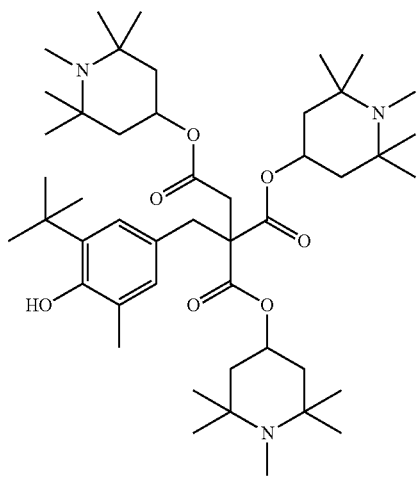
COMPOUND 15
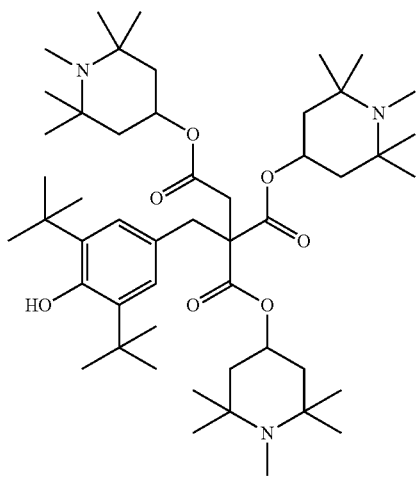
COMPOUND 18
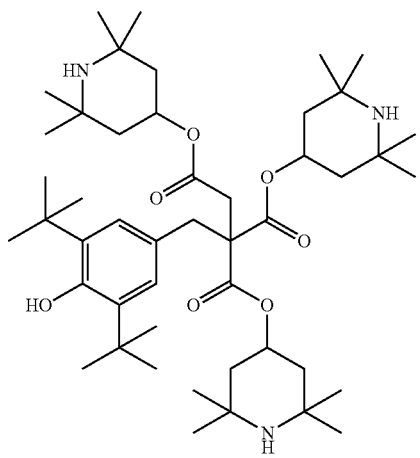
COMPOUND 26
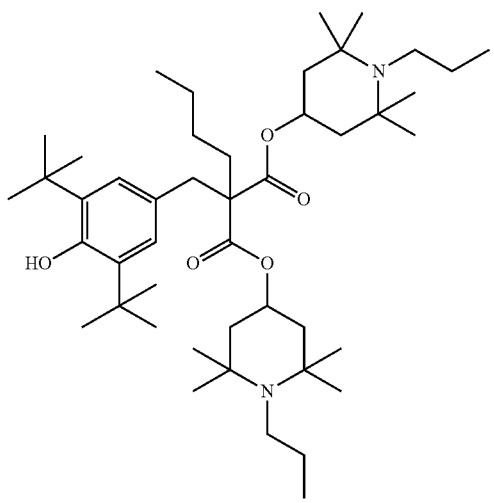
COMPOUND 39
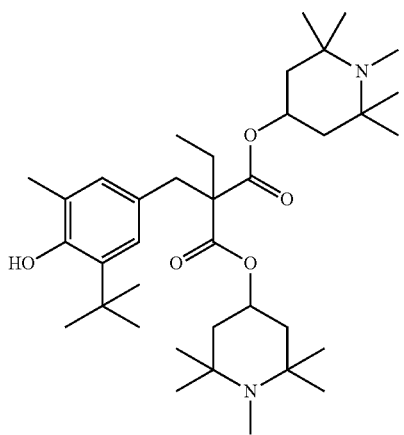

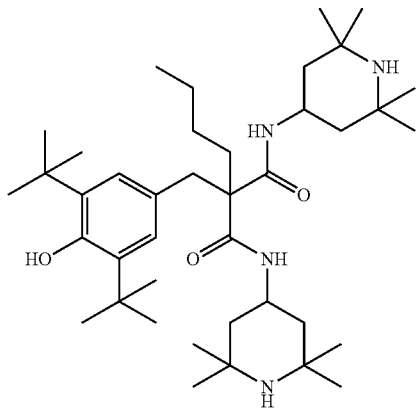

COMPOUND 50

The optical film of the present invention may further be used together with other plasticizers.

The ester compound as a preferred plasticizer of the present invention, which is formed of the foregoing organic acid of Formula (1) and polyvalent alcohol having a valence of 3 or more, is featured in that it exhibits enhanced compatibility with a cellulose ester and can be incorporated at a high ratio, so that no bleed-out occurs even when used with other plasticizers or additives and combined use with other plasticizers or additives are feasible.

When used with other plasticizers, the plasticizer of the Formula (1) is contained preferably in an amount of not less than 50% by mass of all plasticizers, more preferably not less than 70% and still more preferably not less than 80%. The use within such a range can obtain a definite effect, such as enhanced flatness of melt-cast cellulose ester film, even when used in combination with other plasticizers.

There are cited the following plasticizers as preferred other plasticizers.

(Ester Plasticizer formed of Polyvalent Alcohol and Monovalent Carboxylic Acid and Ester Plasticizer Formed of Monovalent Alcohol and Polyvalent Carboxylic Acid)

An ester plasticizer formed of a polyvalent alcohol and a monovalent carboxylic acid or an ester plasticizer formed of a monovalent alcohol and a polyvalent carboxylic acid is preferred, which exhibit enhanced compatibility with a cellulose ester.

Specific examples of plasticizers of an ethylene glycol ester as one of polyvalent alcohol esters include an ethylene glycol alkyl ester plasticizer such as ethylene glycol diacetate and ethylene glycol dibutyrate; an ethylene glycol cycloalkyl ester plasticizer such as ethylene glycol dicyclopropylcarboxylate and ethylene glycol dicyclohexylcarboxylate; an ethylene glycol aryl ester plasticizer such as ethylene glycol dibenzoate and ethylene glycol di-4-methylbenzoate. These alkylate group, cycloalkylate group and arylate group are each the same or different, and may be substituted. Further, the alkylate group, cycloalkylate group and arylate group may be mixed or substituents may be bonded through a covalent bonding. Further, the ethylene glycol portion may be substituted and the partial structure of ethylene glycol may be a part of a polymer or may be regularly pendent thereto, or may be introduced into a part of the molecular structure of an additive such as an antioxidant, an acid scavenger or an ultraviolet absorber.

Specific examples of glycerin ester plasticizers as one of polyvalent alcohol esters include a glycerin alkyl ester such as triacetin, tributyrin, glycerin diacetate caprylate or glycerin oleate propionate; a glycerin cycloalkyl ester such as glycerin cyclopropylcarboxylate, or glycerin tricyclohexylcarboxylate; diglycerin aryl ester such as glycerin tribenzoate or glycerin 4-methylbenzoate; a diglycerin alkyl ester such as diglycerin tetraacetylate, diglycerin tetrapropionate, diglycerin acetate tricaprylate, or diglycerin tetralaurate; a diglycerin cycloalkyl ester such as diglycerin tetracyclobutylcarboxylate or diglycerin tetracyclopentylcarboxylate; and a diglycerin aryl ester such as diglycerin tetrabenzoate or diglycerin 3-methylbenzoate. These alkylate group, cycloalkylcarboxylate group and arylate group may each be the same or different, or may be substituted. The alkylate group, cycloalkylcarboxylate group and arylate group may be mixed or substituents may be bonded through a covalent bonding. Further, the glycerin or diglycerin portion may be substituted and the partial structure of a glycerin ester or diglycerin ester may be a part of a polymer or may be regularly pendent thereto, or may be introduced into a part of the molecular structure of an additive such as an antioxidant, an acid scavenger or an ultraviolet absorber.

Further, as other polyvalent alcohol ester plasticizers are cited those described in JP-A No. 2003-12823, paragraphs 30-33.

These alkylate group, cycloalkylcarboxylate group and arylate group may each be the same or different, or may be substituted. The alkylate group, cycloalkylcarboxylate group and arylate group may be mixed or substituents may be bonded through a covalent bonding. Further, the polyvalent alcohol portion may be substituted and the partial structure of the polyvalent alcohol may be a part of a polymer or may be pendent thereto, or may be introduced into a part of the molecular structure of an additive such as an antioxidant, an acid scavenger or an ultraviolet absorber.

Of ester plasticizers formed of the foregoing polyvalent alcohols and monovalent carboxylic acids, an alkylic polyvalent alcohol aryl ester is preferred and specific examples thereof include ethylene glycol dibenzoate, glycerin tribenzoate, diglycerin tetrabenzoate and exemplified compound 16 described JP-A 2003-12823, paragraph 32.

Specific examples of dicarboxylic acid ester plasticizers as one of polyvalent carboxylic acid esters include an alkyldicarboxylic acid alkyl ester plasticizer such as didodecyl malonate (C1), dioctyl adipate (C4) or dibutyl sebacate (c8); an alkyldicarboxylic acid cycloalkyl ester plasticizer such as dicyclopentyl succinate or dicyclohexyl adipate; an alkyldicarboxylic acid aryl ester such as diphenyl succinate or di(4- methyl)phenyl glutarate; a cycloalkyl-di-carboxylic acid alkyl ester plasticizer such as dihexyl-1,4-cyclohexane dicarboxylate or didecylbicyclo[2.2.1]heptane-2,3-dicarboxylate; a cycloalkyldicarboxylic acid cycloalkyl ester plasticizer such as dicycloalkyl-1,2-cyclobutane dicarboxylate or dicyclopropyl-1,2-cyclohexyl dicarboxylate; acycloalkyldicarboxylic acid aryl ester plasticizer such as diphenyl-1,1-cyclopropyl dicarboxylate or di-2-naphthyl-1,4-cyclohexane dicarboxylate; an arylcarboxylic acid alkyl ester plasticizer such as diethyl phthalate, dimethyl phthalate, dioctyl phthalate, dibutyl phthalate or di-2-ethylhexyl phthalate; an aryldicarboxylic acid cycloalkyl ester plasticizer such as cyclopropyl phthalate or dicyclohexyl phthalate; and an aryldicarboxylic acid aryl ester plasticizer such as diphenyl phthalate or di-4-methylphenyl phthalate. These alkoxy group and cycloalkoxy group may each be the same or different, or may be mono-substituted, and these substituents may further be substituted. The alkyl group or cycloalkyl group may be mixed or these substituents may be bonded through a covalent bonding. Further, the aromatic ring of a phthalic acid may be substituted, and may be a polymer such as dimer, trimer, tetramer or the like. Further, the partial structure of a phthalic acid ester may be a part of a polymer or may be regularly pendent thereto, or may be introduced into a part of the molecular structure of an additive such as an antioxidant, an acid scavenger or an ultraviolet absorber.

Specific examples of other polycarboxylic acid ester plasticizers include an alkyl-polycarboxylic acid alkyl ester plasticizer such as tridecyl tricarbamate or tributyl-meso-butane-1,2,3,4-tetracarboxylate; an alkyl-polycarboxylic acid cycloalkyl ester plasticizer such as tricyclohexyl tricarbamate or tricyclopropyl-2-hydroxy-1,2,3-propanetricarboxylate; an alkylpolycarboxylic acid aryl ester plasticizer such as triphenyl-2-hydroxy-1,2,3-propanetricarboxylate or tetra-3-methylphenyltetrahydrofuran-2,3,4,5-tetracarboxylate; a cycloalkyl-polycarboxylic acid alkyl ester plasticizer such as tetrahexyl-1,2,3,4-cyclobutanetetracarboxylic acid or tetrabutyl-1,2,3,4-cyclopentanetetracarboxylic acid; a cycloalkyl-polycarboxylic acid cycloalkyl ester plasticizer such as tetracyclopropyl-1,2,3,4-cyclobutanetetracarboxylic acid or tricyclohexyl-1,3,5-cyclohexyltricarboxylate; a cycloalkyl-polycarboxylic acid aryl ester plasticizer such as triphenyl-1,3,5-cyclohexyltricarboxylate or hexa-4-methylphenyl-1,2,3,4,5,6-cyclohexylhexacarboxylate; an arylpolycarboxylic acid alkyl ester plasticizer such as tridecyl-benzene-1,2,4-tricarboxylate or tetraoctylbenzebe-1,2,4,5-tetracarboxylate; an aryl-polycarboxylic acid cycloalkyl ester plasticizer such as tricyclopentylbenzene-1,3,5-tricarboxylate or tetracyclohexylbenzene-1,2,3,5-tetracarboxylate; and aryl-polycarboxylic acid aryl ester plasticizer such as triphenylbenzene-1,3,5-tetracarboxylate or hexa-4-methylphenylbenzene-1,2,3,4,5,6-hexacarboxylate. These alkoxy group and cycloalkoxy group may each be the same or different, or may be mono-substituted, and these substituents may further be substituted. The alkyl group or cycloalkyl group may be mixed or these substituents may be bonded through a covalent bonding. Further, the aromatic ring of a phthalic acid may be substituted, and may be a polymer such as dimer, trimer, tetramer or the like. Further, the partial structure of a phthalic acid ester may be a part of a polymer or may be regularly pendent thereto, or may be introduced into a part of the molecular structure of an additive such as an antioxidant, an acid scavenger or an ultraviolet absorber.

Of the foregoing ester plasticizers formed of a polycarboxylic acid and a mono-valent alcohol, a dialkylcarboxylic acid alkyl ester is preferred, and specifically including dioctyl adipate and tridecyl tricarbamate.

(Other Plasticizer)

As other plasticizers usable in the present invention are cited a phosphoric acid ester plasticizer and a polymer plasticizer.

Specific examples of phosphoric acid ester plasticizers include a phosphoric acid alkyl ester such as triacetyl phosphate or tributyl phosphate; a phosphoric acid cycloalkyl ester such as tricyclopentyl phosphate or tricyclohexyl phosphate; and a phosphoric acid aryl ester such as triphenyl phosphate, tricresyl phosphate, crezylphenyl phosphate, octylbiphenyl phosphate, diphenyl-biphenyl phosphate, trioctyl phosphate, tributyl phosphate, trinaphthyl phosphate, trixylyl phosphate or tris-ortho-biphenyl phosphate. These substituents may be the same or different, and may be substituted. The alkyl group, cycloalkyl group and aryl group may be mixed and substituents may be bonded through a covalent bonding.

There are also cited an alkylenebis(dialkylphosphate) such as ethylenebis(dimethylphosphate) or butylenebis(diethylphosphate); an alkylenebis(diarylphosphate) such as ethylenebis(diphenylphosphate) or propylenebis(dinaphthylphosphate); an arylenebis(dialkylphosphate) such as phenylenebis(dibutylphosphate), biphenylenebis(dioctylphosphate), and an arylenebis(diarylphosphate) such as phenylenebis(diphenylphosphate) or naphthylenebis(ditoluylphosphate). These substituents may be the same or different, and may be substituted. The alkyl group, cycloalkyl group and aryl group may be mixed and substituents may be bonded through a covalent bonding.

Further, the partial structure of a phosphoric acid ester may be a part of a polymer or may be regularly pendent thereto, or may be introduced into a part of the molecular structure of an additive such as an antioxidant, an acid scavenger or an ultraviolet absorber. Of the foregoing compounds, a phosphoric acid aryl ester and an arylenebis(diarylphosphate) are preferred and specifically, triphenyl phosphate and phenylenebis(diphenylphosphate) are preferred.

Specifically, polymeric plasticizers include an aliphatic hydrocarbon polymer, an alicyclic hydrocarbon polymer, an acryl polymer such as poly(ethyl acrylate) or poly(methyl methacrylate), a vinyl polymer such as polyvinyl isobutyrate) or poly-N-vinylpyrrolidone, a styrene polymer such as polystyrene or poly(4-hydroxystyrene), a polyester such as poly(butylene succinate), poly(ethylene terephthalate) or poly (ethylene naphthylate), a polyether such as polyethylene oxide or polypropylene oxide, a polyamide, a polyurethane and a polyurea. A number average molecular weight is preferably from 1,000 to 500,000 and more preferably from 5,000 to 200,000. A molecular weight of less than 1,000 causes problems in volatility and a molecular weight or ore than 500,000 results in reduced plasticity and adversely affects a mechanical property of cellulose ester film. These polymeric plasticizers may be a homopolymer comprised of a single repeating unit or a copolymer comprised of plural repeating units. Two or more of the foregoing polymers may be used in combination.

The optical film of the present invention adversely affects optical uses when colored, so that the yellow index (YI) is preferably not more than 3.0 and more preferably not more than 1.0. The yellow index is determined based on JIS-K 7103.

Similarly to the afore-mentioned cellulose ester, the plasticizer used in the present invention preferably removes impurities such as residual acids, inorganic salts and organic low-molecules which were carried-in from the production stage or generated during storage, and the purity thereof is preferably not less than 99%. Residual acids and water are each preferably 0.01 to 100 ppm, whereby thermal deterioration is restrained in melt-casting a cellulose resin, resulting in enhancements of film formation stability and optical and mechanic properties of the film.

(Antioxidant Used in Melt Film Formation)

A cellulose ester undergoes accelerated degradation by not only heat but also oxygen under a high temperature environment in which melt film formation occurs, so that the optical film of the present invention preferably contains an antioxidant as a stabilizer.

Antioxidants usable in the present invention may be any compound capable of inhibiting oxygen-deterioration of a melt-formed material and specifically useful antioxidants include, for example, a phenol compound, a hindered amine compound, a phosphorus-containing compound, a sulfur-containing compound, a heat-resistant process stabilizer and an oxygen scavenger. Of these, the phenol compound, the hindered amine compound and the phosphorus-containing compound are preferred. These compounds are the same as those explained for (Antioxidant used for Washing of Cellulose Ester). Incorporation of such a compound can prevent coloring or reduced strength of the formed material due to heat or heat-oxidative deterioration during melt formation, without lowering transparency or heat-resistance. Such antioxidants may be used singly or in combination of two or more.

Phenol compounds are commonly known ones, for example, as described in U.S. Pat. No. 4,839,405 in col. 12-14, including 2,6-dialkylphenyl derivative compounds. Of such compounds is preferred a compound represented by the following Formula (A):

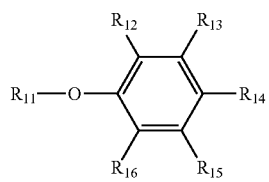

Formula (A)

wherein $R_{11}$, $R_{12}$, $R_{13}$, $R_{14}$ and $R_{15}$ are each a substituent. Examples of such a substituent include a hydrogen atom, a halogen atom (e.g., fluorine atom, chlorine atom), an alkyl group (e.g., methyl, ethyl, isopropyl, hydroxyethyl, methoxymethyl, trifluoromethyl, t-butyl), a cycloalkyl group (e.g., cyclopentyl, cyclohexyl), an aralkyl group (e.g., benzyl, 2-phenethyl), an aryl group (e.g., phenyl, naphthyl, p-tolyl, p-chlorophenyl), an alkoxy group (e.g., methoxy, ethoxy, isoproxy, butoxy), an aryloxy group (e.g., phenoxy), a cyano group, an acylamino group (e.g., acetylamino, propionylamino), an alkylthio group (e.g., methylthio, ethylthio, butylthio), an arylthio group (e.g., phenylthio), a sulfonylamino group (e.g., methanesulfonylamino, benzenesulfonylamino), a ureido group (e.g., 3-methylureido, 3,3-dimethylureido, 1,3-dimethylureido), a sulfamoylamino group (e.g., dimethylsulfamoylamino), a carbamoyl group (e.g., methylcarbamoyl, ethylcarbamoyl, dimethylcarbamoyl), a sulfamoyl group (e.g., ethylsulfamoyl, dimethylsulfamoyl), an alkoxycarbonyl group (e.g., methoxycarbonyl, ethoxycarbonyl), an aryloxycarbonyl group (e.g., phenoxycarbonyl), a sulfonyl group (e.g., methanesulfonyl, butanesulfonyl, phenylsulfonyl), an acyl group (e.g., acetyl, propanoyl, butyloyl), an amino group (e.g., methylamino, ethylamino, dimethylamino), a cyano group, a hydroxy group, a nitro group, an amine oxide group (e.g., pyridine-oxy), an imido group (e.g., phthalimido), a disulfide group (e.g., benzenedisulfide, benzothiazolyl-2-disulfide), a carboxy group, a sulfo group and a heterocyclic group (e.g., pyrrole group, pyridyl group, pyrazolyl group, imidazolyl, pyridyl group, benzoimidazolyl group, benzthiazolyl group, benzoxazolyl group). These substituents may further be substituted. Of the phenol compounds represented by Formula (A), a phenol compound, in which $R_{11}$ is a hydrogen atom, $R_{12}$ and $R_{16}$ are each t-butyl group, is preferred. Specific examples of such a phenol compound include n-octadecyl 3-(3,5-di-t-butyl-4-hydroxyphenyl)-propionate, n-octadecyl 3-(3,5-di-t-butyl-4-hydroxyphenyl)-acetate, n-octadecyl 3,5-di-t-butyl-4-hydroxyphenyl)-acetate, n-octadecyl 3,5-di-t-butyl-4-hydroxybenzoate, n-hexyl 3,5-di-t-butyl-4-hydroxybenzoate, n-decyl 3,5-di-t-butyl-4-hydroxybenzoate, neo-dodecyl 3-(3,5-di-t-butyl-4-hydroxyphenyl)propionate, dodecyl β-(3,5-di-t-butyl-4-hydroxyphenyl)propionate, ethyl α-(4-hydroxy-3,5-di-t-butylphenyl)isobutyrate, octadecyl α-(4-hydroxy-3,5-di-t-butylphenyl)isobutyrate, octadecyl α-(4-hydroxy-3,5-di-t-butylphenyl-4-hydroxyphenyl)propionate, 2-(n-octylthio) ethyl 3,5-di-t-butyl-4-hydroxy-benzoate, 2-(n-octylthio) ethyl 3,5-di-t-butyl-4-hydroxy-phenylacetate, 2-(n-octylthio)ethyl 3,5-di-t-butyl-4-hydroxy-phenylacetate, 2-(n-octylthio)ethyl 3,5-ditobutyl-4-hydroxyphenylacetate, 2-(n-octylthio)ethyl 3,5-di-t-butyl-4-hydroxy-benzoate, 2-(2-hydroxythio)ethyl 3,5-di-t-butyl-4-hydroxybenzoate, diethylglycyl bis-(3,5-di-t-butyl-4-hydroxy-phenyl)propionate, 2-(n-octadecylthio)ethyl-3(3,5-di-t-butyl-4-hydroxyphenyl)propionate, stearylamide N,N-bis-[ethylene-3-(3,5-di-t-butyl-4-hydroxyphenyl)propionate], n-butylimino N,N-bis-[ethylene-3-(3,5-di-t-butyl-4-hydroxyphenyl) propionate], 2-(2-2-stearoyloxyethylthio)ethyl 3,5-di-t-butyl-4-hydroxybenzoate, 2-(2-stearoyloxyethylthio)ethyl 7-(3-methyl-5-t0butyl-4-hydroxyphenyl)heptanoate, 1,2-propylene glycol bis[3-(3,5-di-t-butyl-4-hydroxyphenyl)propionate], ethylene glycol bis-[3-(3,5-di-t-butyl-4-hydroxyphenyl)propionate], neopentylglycol bis-[3-(3,5-di-t-butyl-4-hydroxyphenyl)propionate], ethylene glycol bis-(3,5-di-t-butyl-4-hydroxyphenylacetate), glycerin-1-n-octadecanoate-2,3-bis-(3,5-di-t-butyl-4-hydroxyphenylacetate), pentaerythritol-tetrakis-[3-(3',5'-di-t-butyl-4'-hydroxyphenyl)propionate], 1,1,1-trimethylolethane-tris-[3-(3,3-di-t-butyl-4-hydroxyphenyl) propionate], sorbitol hexa-[3-(3,5-di-t-butyl-4-hydroxyphenyl)propionate], 2-hydroxyethyl 7-(3-methyl-5-t-butyl-4-hydroxyphenyl)propionate, 2-stearoyloxyethyl 7-(3-methyl-5-t-butyl-4-hydroxyphenyl)heptanoate, 1,6-n-hexanediol-bis[(3',5'-di-t-butyl-4-hydroxyphenyl)propionate], and pentaerythritol-tetrakis(3,5-di-t-butyl-4-hydroxyhydrocinnamate). The foregoing type phenol compounds are commercially available from Ciba Special Chemicals, for example, trade name "Irganox 1076" and "Irganox 1010".

The foregoing hindered amine compound is preferably a compound represented by the following Formula (B):

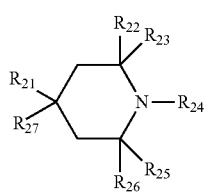

Formula (B)

wherein $R_{21}$, $R_{22}$, $R_{23}$, $R_{24}$, $R_{25}$, $R_{26}$ and $R_{27}$ are each a substituent. The substituent is the same as defined in the foregoing Formula (A). $R_{24}$ is preferably a hydrogen atom or a methyl group, $R_{27}$ is preferably a hydrogen atom, $R_{22}$, $R_{23}$, $R_{25}$ and $R_{26}$ are each preferably a methyl group.

Specific examples of such a hindered amine compound include bis(2,2,6,6-tetramethyl-4-piperidyl)sebacate, bis(2, 2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyl-2,2,6,6-tetramethyl-4-piperidyl)sebacate, bis(1,2,2,6,6-pentamethyl-4-piperidyl)2-(3,5-di-t-butyl-4-hydroxybenzyl)-2-butylmalonate, bis(1-acryloyl-2,2,6,6-tetramethyl-4-piperidyl)2,2-bis(3,5-di-t-butyl-4-hydroxybenzyl-2-butylmalonate, bis(1,2,2,6,6-pentamethyl-4-piperidyl)decanedioate, 2,2,6,6-tetramethyl-4-piperidylmethacrylate, 4-[3-(3,5-di-t-butyl-4-hydroxyphenyl)propionyloxy]-1-[2-(3-(3,5-di-t-butyl-4-hydroxy-phenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl)-1,2, 3,4-butanetetracarboxylate, and tetrakis(1,2,2,6,6-pentamethyl-4-piperidyl)-1,2,3,4-butanetetracarboxylate. There are also cited polymer type compounds and specific examples thereof include high molecular weight HALS in which plural piperidine rings are bonded through a triazine skeleton, such as a polycondensation product of N,N',N",N"'-tetrakis-[4,6-bis-[butyl-(N-methyl-2,2,6,6-tetramethylpiperidine-4-yl)amino]triazine-2-yi]-4,7-diazadecane-1,10-diamine, dibutylamine, 1,3,5-triazine•N,N'-bis(2,2,6,6-tetramethyl-4-piperidyl)-1,6-hexamethylenediamine and N-(2,2,6,6-tetramethyl-4-piperidyl(butylamine; a polycondensation product of dibutylamine, 1,3,5-triazine and N,N'-bis(2,2,6,6-tetramethyl-4-piperidyl)butylamine; poly[{(1,1, 3,3-tetramethylbutyl)amino-1,3,5-triazine-2,4-diyl}{2,2,6, 6-tetramethyl-4-piperidyl}imino]hexamethylene{(2,2,6,6-tetramethyl-4-piperidyl)imino}hexamethylene{(2,2,6,6-tetramethyl-4-piperidyl)imino}), a polycondensation product of 1,6-hexanediamine-N,N'-bis(2,2,6,6-tetramethyl-4-piperidyl) and morpholine-2,4,6-trichloro-1,3,5-triazine and poly[(6-morpholino-s-triazine-2,4-diyl)[2,2,6,6-tetramethyl-4-piperidyl]imino]hexamethylene[(2,2,6,6-tetramethyl-4-piperidyl)imino])); and compounds in which a piperidine ring is bonded through ester bonding, such as a polymer of dimethyl succinate and 4-hydroxy-2,2,6,6-tetramethyl-1-piperidine ethanol and a mixed esterified compound of 1,2,3,4-butanetetracarboxylic acid and 1,2,2,6,6-pentamethyl-4-piperidinol and 3,9-bis(2-hydroxy-1,1-dimethylethyl)-2,4,8,10-tetraoxaspiro[5,5]undecane, but are not limited to these. Of these are preferred a polycondensation product of dibutylamine, 1,3,5-triazine and N,N'-bis(2, 26,6-tetramethyl-4-piperidyl)butylamine, poly[{1,1,3,3-tetramethylbutyl}amino-1,3,5-triazine-2,4-diyl]{(2,2,6,6-tetramethyl-4-piperidyl)imino}hexamethylene{2,2,6,6-tetramethyl-4-piperidyl}imino}], and a polymer of dimethyl succinate and 4-hydroxy-2,2-6,6-tetramethyl-1-piperidine-ethnol, each of which has a number average molecular weight of 2,000 to 5,000.

The foregoing type amine compounds are commercially available, for example, from Ciba Speciality Chemicals, as a trade name "Tinuvin 144" or "Tinuvin 770" and from Asahi Denka Kogyo Co., Ltd. as a trade name "ADK STAB LA-52".

The foregoing phosphorus-containing compound is preferably a compound having, in the molecule, a partial structure represented by the following Formula (C-1), (C-2) or (C-3):

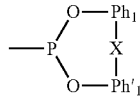

Formula (C-1)

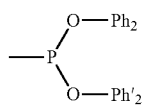

Formula (C-2)

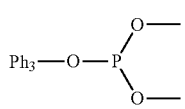

Formula (C-3)

In the formulas, $Ph_1$ and $Ph'_1$ are each a phenylene group, provided that the hydrogen atom(s) of the phenylene group may be replaced by a phenyl group, an alkyl group having 1 to 8 carbon atoms, a cycloalkyl group having 5 to 8 carbon atoms, an alkylcycloalkyl group having 6 to 12 carbon atoms or an aralkyl group having 7 to 12 carbon atoms. $Ph_1$ and $Ph'_1$ may be the same or different. X is a single bond, a sulfur atom or —$CHR_6$— in which $R_6$ is a hydrogen atom, an alkyl group having 1 to 8 carbon atoms or a cycloalkyl group having 5 to 8 carbon atoms. $Ph_2$ and $Ph'_2$ are each a phenyl group or a biphenyl group and the hydrogen atom(s) of the phenyl group or the biphenyl group may be replaced by a phenyl group, an alkyl group having 1 to 8 carbon atoms, a cycloalkyl group having 5 to 8 carbon atoms, an alkylcycloalkyl group having 6 to 12 carbon atoms or an aralkyl group having 7 to 12 carbon atoms. $Ph_2$ and $Ph'_2$ may be the same or different. $Ph_3$ is a phenyl group or a biphenyl group and the hydrogen atom(s) of the phenyl group or the biphenyl group may be replaced by a phenyl group, an alkyl group having 1 to 8 carbon atoms, a cycloalkyl group having 5 to 8 carbon atoms, an alkylcycloalkyl group having 6 to 12 carbon atoms or an aralkyl group having 7 to 12 carbon atoms. These groups may be substituted by a substituent as defined in the Formula (A).

Specific examples of such a phosphorus-containing compound include monophosphate compounds such as triphenyl phosphite, diphenyl isodecyl phosphite, phenyl diisodecyl phosphite, tris(nonylphenyl)phosphite, tris(dinonylphenyl) phosphite, tris(2,4-di-t-butylphenyl)phosphite, and 10-(3,5-di-t-butyl-4-hydroxybenzyl)-9,10-dihydro-9-oxa-10-phosphenthrene-10-oxide, 6-[3,(3-t-butyl-4-hydroxy-5-methylphenyl)propoxy]-2,4,8,10-tetra-t-butyldibenz[d,f] [1.3.2]dioxaphosphepin; and diphosphite compounds such as 4,4'-butylidene-bis(3-methyl-6-t-butylphenyl-di-tridecylphosphite) and 4,4'-isopropylidene-bis(phenyl-di-alkyl ($C_{12}$-$C_{15}$)phosphite). The foregoing phosphorus-containing compounds are also commercially available, for example, trade names "Sumilizer GP" from Sumitomo Kagaku Kogyo Co., Ltd., "ADK STAB PEP-24G and "ADK STAB PEP-36" from Asahi Denka Kogyo Co., Ltd.

The foregoing sulfur-containing compound is preferably a compound represented by following Formula (D):

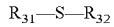

Formula (D)

In Formula (D), $R_{31}$ and $R_{32}$ are each a substituent. The substituent is the same as defined in the foregoing Formula (A). $R_{31}$ and $R_{32}$ are each an alkyl group.

Specific examples of such a sulfur-containing compound include dilauryl 3,3-thiodipropionate, myristyl 3,3'-thiodipropionate, distearyl 3,3-thiodipropionate, lauryl stearyl 3,3-thiodipropionate, pentaerythritol-tetrakis(β-lauryl-thiopropionate) and 3,9-bis(2-dodecylthiomethyl)-2,4,8,10-tetraoxaspiro[5,5]undecane. The sulfur-containing compounds are commercially available from, for example, Sumitomo Kagaku Kogyo Co., Ltd., trade name "Sumilizer TPL-R" and "Sumilizer TP-D".

The added amount of an antioxidant is usually 0.05-25 mass part, preferably 0.05-10 mass parts and further preferably 0.1-3 mass parts in 100 mass pats of cellulose ester.

Similarly to the afore-mentioned cellulose ester, the antioxidant preferably removes impurities such as residual acids, inorganic salts and organic low-molecules which were carried-in from the production stage or generated during storage, and the purity thereof is preferably not less than 99%. Residual acids and water are each preferably 0.01 to 100 ppm, whereby thermal deterioration is restrained in melt-casting a cellulose resin, resulting in enhancements of film formation stability and optical and mechanic properties of the film.

(Acid Scavenger)

An acid scavenger is one which plays a role of trapping acids (protonic acids) remaining in cellulose ester carried-in from the production stage. When melting a cellulose ester, moisture in the polymer and heat accelerate hydrolysis and, for example, CAP produces acetic acid or propionic acid. Compounds cable of chemically bonding acids are usable, and examples thereof include, for example, compounds containing an epoxy, tertiary amine or ether structure, but are not limited to these.

Specifically, it is preferred to contain epoxy compound as an acid scavenger, described in U.S. Pat. No. 4,137,201. Such epoxy compounds as an acid scavenger are known in the relevant technical field and include diglycidyl ethers of various polyethylene glycols, specifically, diglycidyl ethers of a polyglycol derived by condensation of 8-40 mols of ethylene oxide per mol of polyglycol or glycerol, metal epoxy compounds (for example, those which have been employed in or with the vinyl chloride polymer composition), an epoxydated ether condensation product, a diglycidyl ether of bisphenol A (or 4,4'-dihydroxydiphenyldimethylmethane), an epoxydated unsaturated fatty acid ester (specifically, 2-22 carbons fatty acid 4-2 carbons alkyl ester, e.g., butyl epoxy-stearate), various epoxydated long fatty acid triglyceride (epoxydated vegetable oil typified by, for example, epoxydated soybean oil, or unsaturated natural oil, which are also called an epoxydated natural glyceride or an unsaturated fatty acid, and these fatty acids generally have 12-22 carbon atoms). Specifically preferred compounds are commercially available epoxy group-containing epoxide resin, EPON 815c and an epoxydated ether oligomer condensation product, represented by the following Formula (4):

wherein n is an integer of 0 to 12. Further, acid scavengers usable in the present invention include those described in JP-A No. 5-194788, paragraph 87-105.

Similarly to the afore-mentioned cellulose ester, the acid scavenger used in the present invention preferably removes impurities such as residual acids, inorganic salts and organic low-molecules which were carried-in from the production stage or generated during storage, and the purity thereof is preferably not less than 99%. Residual acids and water are each preferably 0.01 to 100 ppm, whereby thermal deterioration is restrained in melt-casting a cellulose resin, resulting in enhancements of film formation stability and optical and mechanic properties of the film.

The acid scavenger is also designated as an acid trapping agent, an acid capturing agent or an acid catcher, but in the present invention, but usable in the present invention with no difference due to these designations.

(Ultraviolet Absorber)

An ultraviolet absorber is preferably one which excels in capability to absorb ultraviolet rays at wavelengths of 370 nm or less from the perspective of preventing deterioration of a polarizer or a display due to ultraviolet rays and exhibits reduced absorption of visible light of 400 nm or more from the perspective of a liquid crystal display. Examples thereof include oxybenzophenone compounds, benzotriazole compounds, salicylic acid ester compounds, benzophenone compounds, cyanoacrylate compounds, and nickel complex salt compounds and of these, benzophenone compounds and benzotriazole compounds with less coloring are preferred. The structure of an ultraviolet absorber may be a polymer such as a dimer, a trimer, a tetramer and the like, in which a plurality of ultraviolet absorbing sites exist in the molecule and there may be used, for example, ultraviolet absorbers described in JP-A Nos. 10-182621 and 8-337574 and polymeric ultraviolet absorbers described in JP-A No. 6-148430.

Specific examples of useful benzotriazole ultraviolet absorbers include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-57-methylphenyl)benzotriazole, 2,2-methylenebis(4-(1,1,3,3-tetramethylbutyl)-6-(2H-benzotriazole-2-yl) phenol), 2-(2'-hydroxy-3'-tert-butyl-5'-methylphenyl)-5-chlorobenzotriazole, 2-(2H-benzotriazole-2-yl)-6-(straight or branched dodecyl)-4-methylphenol, a mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl)phenyl] propionate, but are not limited thereto.

There are also usable TINUVIN 109, TINUVIN 171, TINUVIN 360 (which are commercially available from Ciba Speciality Chemicals).

Formula (4)

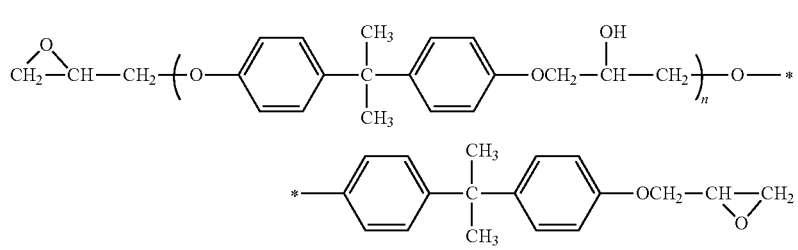

Specific examples of benzophenone compounds include 2,4-dihydroxybenzophenone, 2,2'-dihydroxy-4-methoxybenzophenone, 2-hydroxy-4-methoxy-5-sulfobenzophenone and bis(2-methoxy-4-hydroxy-5-benzoylphenylmethane), but are not limited thereto.

In the present invention, an ultraviolet absorber is contained preferably in an amount of 0.1 to 20% by mass of the composition relating to the present invention, more preferably 0.5 to 10% by mass, and still more preferably 1 to 5% by mass. These ultraviolet absorbers may be used singly or in combination.

(Viscosity Lowering Agent)

In the present invention, there may be added a hydrogen bonding solvent to reduce melt viscosity. The hydrogen bonding solvent refers to an organic solvent capable of forming a hydrogen atom-mediated "bond" caused between an electrically negative atom (e.g., oxygen, nitrogen, fluorine, chlorine) and a hydrogen atom covalent-bonded to the electrically negative atom, in other word, it means an organic solvent capable of arranging molecules approaching to each other with a large bonding moment and by containing a bond including hydrogen such as O—H ((oxygen hydrogen bond), N—H (nitrogen hydrogen bond) and F—H (fluorine hydrogen bond), as described in J. N. Israelachibiri, "Intermolecular Force and Surface Force" (translated by Tamotsu Kondo and Hiroyuki Oshima, published by McGraw-Hill. 1991). The hydrogen bonding solvent is capable of forming a hydrogen bond between celluloses stronger than that between molecules of cellulose resin, the melting temperature of a cellulose resin composition can be lowered by the addition of the hydrogen bonding solvent than the glass transition temperature of a cellulose resin alone in the melting casting method conducted in the present invention. Further, the melting viscosity of a cellulose resin composition containing the hydrogen bonding solvent can be lowered than that of a cellulose resin in the same melting temperature.

Examples of the hydrogen bonding solvents include alcohols such as methanol, ethanol, propanol, isopropanol, n-butanol, sec-butanol, t-butanol, 2-ethyl hexanol, heptanol, octanol, nonanol, dodecanol, ethylene glycol, propylene glycol, hexylene glycol, dipropylene glycol, polyethylene glycol, polypropylene glycol, methyl cellosolve, ethyl cellosolve, butyl cellosolve, hexyl cellosolve, and glycerol; ketones such as acetone and methyl ethyl ketone; carboxylic acids such as formic acid, acetic acid, propionic acid, and butyric acid; ethers such as diethyl ether, tetrahydrofuran, and dioxane; pyrolidone such as N-methylpyrolidone; and amines such as trimethylamine and pyridine. These hydrogen bonding solvents may be used singly or in combination of two or more. Of these, alcohols, ketones, and ethers are preferred, and especially, methanol, ethanol, propanol, isopropanol, octanol, dodecanol, ethylene glycol, glycerol, acetone, and tetrahydrofuran are preferred. Further, water-soluble solvents such as methanol, ethanol, propanol, isopropanol, ethylene glycol, glycerol, acetone, and tetrahydrofuran are specifically preferred. Herein, "water-soluble" means that the solubility in 100 g of water is 10 g or more.

(Retardation Controlling Agent)

In the optical film of the present invention, a polarizing plate treatment to provide an optical compensation function may be conducted such that a liquid crystal layer is formed on an optical film by forming an orientation layer so as to combine the retardation of the optical film and that of the liquid crystal layer, or a polarizing plate protection film may be made to contain a compound for adjusting the retardation. As a compound to be added to control the retardation can be employ an aromatic compound containing two or more aromatic rings as a retardation controlling agent, described in European Patent No. 911,656 A2 Two or more of such aromatic compounds may be used. The aromatic ring of such an aromatic compound includes not only an aromatic hydrocarbon ring but also an aromatic heterocyclic ring. An aromatic heterocyclic ring is specifically preferred such an aromatic heterocyclic ring is generally an unsaturated heterocyclic ring. In particular, compounds having 1,3,5-triazine ring are specifically preferred.

(Polymer Material)

The optical film of the present invention may be incorporated with a polymer material or an oligomer, other than a cellulose ester. Such a polymer material or an oligomer is preferably one which excels in compatibility with the cellulose ester and the formed film preferably exhibits at least 80% transmittance, more preferably at least 90%, and still more preferably at least 92%. The object of incorporating at least one of a polymer material and an oligomer includes the intension to control the viscosity at the time of heat-melting or to achieve enhancement of physical properties of the processed film. In that case, there may be incorporated additives, other than the foregoing ones.

(Other Particles)

Other than aforementioned irregularly shaped particles, silicon dioxide of which primary particles are spherical may be added to provide a lubricating property, whereby conveyance and winding-up of the film become easier.

Particles such as silicon dioxide are often subjected to a surface treatment using an organic material. Such particles are preferable since haze of the film is reduced. Examples of an organic material for the heat treatment include: halosilanes, alkoxysilanes, a silazane and a siloxane.

A larger particle diameter results in a larger lubricating effect, while a smaller particle diameter results in an excellent transparency. The average diameter of the particles is in the range of 0.005-1.0 μm, which may be of primary particles or of secondary particles. The content of the particles in the resin is preferably 0.01-1 g per 1 $m^2$.

Examples of silicon dioxide particles include: AEROSIL 200, 200V, 300, R972, R972V, R974, R202, R812, R805, OX50 and TT600, each manufactured by NIPPON AEROSIL Co., Ltd. Of these, preferable are AEROSIL 200V, R972, R972V, R974, R202 and R812. These particles may be used in combination of two or more kinds, and, when these particle are used in combination, these particles may be mixed in an arbitrary ratio.

In such a case, particles having a different diameter or particles of different materials, for example, AEROSIL 200V and R972V in the mass ratio range of 0.1:99.9-99.9:0.1 may be used.

(Other Additive)

Other than the above, thermal stabilizer, for example, inorganic particles such as kaolin, talc, diatom earth, quartz, barium sulfate, titanium oxide or alumina; or a salt of an alkaline earth metal such as calcium or magnesium may be added. Further, an antistatic agent, a flame retarder, lubricant, or oil may be added.

Next, a manufacturing method of an optical film according to the present invention is based on a melt casting method.

FIG. 1 is a flow sheet to schematically show a melt casting apparatus utilized for a manufacturing method of the optical film of the present invention.

Referring to said drawing, for example pellets of cellulose ester, a plasticizer and an antioxidant are charged into hopper (11), raw materials being conveyed from hopper (11) to Henschel mixer (12) at a predetermined supplying rate to be mixed. Raw materials having been mixed by Henschel mixer (12) are conveyed to extruder (13) to be melted with heat, for example, at 250° C. and the melted substance is extruding molded through casting die (1) according to the present invention. The melted substance having been extruded through casting die (1) is cooled by cooling roll (15) to be surface corrected. In this case, web (film) (10) and cooling roll (15) are preferably brought in close contact, and as a method to bring web (film) (10) and cooling roll (15) in close contact, they are pressed by use of touch roll (16).

Successively, web (film) (10) is guided to a stretcher (not shown in the drawing), being stretched in the longitudinal direction in the stretcher, and then web (film) (10) is stretched in the width direction by use of tenter (17) followed by being relaxed, being wound up by winder (19) after having been transported by transport role (18), whereby cellulose ester film having a role form is prepared.

It is preferable that resin pellets and a powder material as a raw material are dried in advance. It is preferable drying is performed to make moisture down to not more than 1,000 ppm more preferably down to not more than 200 ppm by use of a vacuum or reduced pressure drier or a moisture eliminating drier with a hot wind.

At the time of introducing a raw material from supply hopper (11) to extruder (13), which are shown in FIG. 3, it is preferable to prevent such as oxidation decomposition by making a vacuum, reduced pressure or inert gas atmosphere. In the case that additives such as a plasticizer are not mixed in advance, they may be mixed on the way of extruder (13). For uniform addition, it is preferable to utilize a mixing device such as a static mixer.

In the present invention, applied can be both a method in which pellets comprising thermoplastic resin and powder are melting kneaded by an extruder (not shown in the drawing) to prepare pellets, which are melting kneaded by another extruder (13) followed by being cast on cooling roll (metal support) (15) from casting die (1) to make film; and a method in which pellets and powder are melting kneaded by extruder (13) and cast the resulting mixture as it is on cooling roll (metal support) (15) from casting die (1) to make film.

Particle size of powder is preferably not more than 250 μm based on sieve net opening (JIS Z 8801-1). When the particle size of powder is excessively large, sufficient mixing and dispersion can not be achieved even by kneading with extruder (13), and powder may be occasionally adhered to the barrel inner wall and a thermally deteriorated substance is accumulated on said portion, which sometimes flow out to result in easy generation of trouble on film due to foreign matter arising from a thermally deteriorated substance. Further, when the particle size is excessively small, there may cause a problem in handling. Pellets preferably have diameter and length of 1-5 mm.

Further, in a system comprising plural materials having different melting points being mixed, it is possible that a half-melted substance of a millet-and-rice cake form is once prepared at a temperature, at which only a substance having a lower melting point melts, and said half-melted substance is charged into extruder (13) to make film. In the case of utilizing resin or an additive which are liable to be thermally decomposed, preferable is a method to form film directly without preparing pellets or a method to form film after preparing a half-melted substance of a millet-and-rice cake form such as described above to decrease melting times of resin.

In the present invention, extruder (13) utilized for film formation may be either uniaxial extruder (13) or biaxial extruder (13). Since suitable kneading degree is required in the case of direct film formation without preparation of pellets from materials, biaxial extruder (13) is preferably utilized, however, a suitable kneading degree can be achieved to enable film formation by changing the screw form into a kneading type screw such as a Madock type, a Unimelt type and Dulmadge type even with uniaxial extruder (13). In either of a uniaxial extruder or a biaxial extruder, it is preferable to provide a vent opening and to eliminate a gas through the vent opening by use of such as a vacuum pump. In the case of preparing pellets or a half-melted substance of a millet-and-rice cake form, either uniaxial extruder (13) or biaxial extruder (13) may be utilized.

It is preferable to lower oxygen concentration in the extruder (13) and in a cooling process after extrusion, by substitution with an inert gas such as a nitrogen gas or by pressure reduction.

With respect to temperature of resin in extruder (13), a preferable condition differs depending on viscosity and ejection volume of resin, or thickness of a sheet prepared, however, is generally preferably in a range of not lower than Tg and not higher than Tg+100° C., when glass transition temperature of a molded material is Tg. The melting temperature is more preferably not lower than Tg+10° C. and not higher than Tg+90° C. The melting viscosity at the extrusion is 10-100,000 poise and preferably 100-10,000 poise. Further, retention time of resin in extruder (13) is preferably the shorter, and not longer than 5 minutes, more preferably not longer than 3 minutes and most preferably not longer than 2 minutes. The retention time varies depending on a type of extruder (13) and an extrusion condition, however, can be shortened by adjusting such as a supply amount of a material, L/D, a rotation number of a screw, and a groove depth of a screw.

The form and rotation number of a screw of extruder (13) are appropriately selected depending on the viscosity and ejection volume of resin. In the present invention, share rate in extruder (13) is preferably 1/second-10,000/second, more preferably 5/second-1,000/second and most preferably 10/second-100/second. It is preferable to arrange a pre-filter on the outlet side of extruder (13) to prevent jamming of a gear pump with foreign materials and to decrease the load of a main filter.

For example, it is preferable that a sintered filter made of screen or metal fiber having 50/80/100 mesh is appropriately provided. It is preferable to utilize an on-line changeable type.

It is preferable to set t/h to not more than 10 in the case of the thickness of film being not less than 70 μm and less than 100 μm, to set t/h to not more than 15 in the case of the thickness of film being not less than 50 μm and not more than 70 μm, and to set t/h to not more than 20 in the case of the thickness of film being less than 50 μm, when the thickness of resin immediately after having been adhered to first cooling roll (15) is h. It is possible to restrain elongation of a ribbon to maintain small retardation in the flow direction by setting t/h to the aforesaid value. It is possible to maintain good film flatness by setting R of the lip top to preferably not more than 100 μm and more preferably not more than 50 μm.

As a thickness adjusting mechanism, it is preferable to adopt a heater method to adjust temperature being dividing along the width direction, a manual volt method to mechanically adjust the lip opening degree, or a heat volt method to adjust the lip opening degree utilizing volt shrinkage by use of a heater.

The materials of a die includes those which are thermally sprayed or plated with such as nickel, hard chromium, chromium carbide, chromium nitride, titanium carbide, titanium carbide nitride, titanium nitride or ultra-hard ceramic (tungsten carbide, aluminum oxide, chromium oxide) having been melting ejected or plated, followed by being subjected to a processing such as puffing, rapping utilizing a grinding stone of not less than #1,000, flat surface grinding utilizing a diamond grinding stone of not less than #1,000 (the grinding direction is perpendicular to the resin flow direction), electrolysis grinding or electrolysis complex grinding as a surface processing.

A preferable material of a die slip portion is similar to that of a die. It is important to decrease friction between a lip and resin to prevent shark skin, and it is preferable to utilize K05MFC manufactured by Dual Spiral System Inc. Further, the surface roughness of a lip portion is preferably not more than 0.5 s and more preferably not more than 0.2 s.

In the present invention, the material extruded from casting die (1) is cooled by cooling roll (15) to be surface corrected. The time until the material contacts with first cooling roll (15) from casting die (1) is preferably the shorter, and is within 10 seconds, preferably within 5 seconds and most preferably within 2 seconds, when cooling roll (15) with which the material extruded from casting die (1) firstly contacts is first cooling roll (15). Further, the distance from casting die (1) to first cooling roll (15) is preferably not less than 10 mm and not more than 100 mm.

The temperature of resin immediately before adhering to first cooling roll (15) is preferably not lower than Tg and more preferably not lower than Tg+50° C. It is possible to make retardation along the flow direction generated by elongation of a ribbon small by keeping a high temperature of resin. It is preferable to keep resin warm in the air gap from the casting die (1) outlet to immediately before resin adhering to first cooling roll (15). As a temperature maintenance method, such as induction heating with micro waves and heating with radiant heat by use of an infrared heater can be utilized. As an infrared heater, a far-infrared ceramic heater of an electric type, a gas type, an oil type or a steam type can be utilized.

In the present invention, at the time of polymer flowing out from casting die (1), it is preferable to arrange a suction device at the neighborhood of casting die (1) to prevent contamination of casting die (1) and cooling role (15) by such as sublimated substances. A suction device is necessary to be provided with a remedy such as heating by a heater not to make the device itself be an adhering place for sublimated substances. Further, it is necessary to provide a suitable suction pressure, because film quality such as cross streaks may be affected when the suction pressure is too large while effective suction of sublimated substances is not possible when the suction pressure is too small.

In the present invention, it is preferable to bring film and cooling roll (15) in close contact. As a method to bring film and cooling roll (15) in close contact, utilized can be such as pressing by use of touch roll (16), an electrostatic adhesion method, an air-knife and a reduced pressure chamber.

At least one cooling roll (15) is arranged, however, it is preferably not less than two rolls are arranged to enhance smoothness against the both surfaces of film and the both surfaces are preferably brought in contact with cooling roll (15). Further, it is also possible to provide cooling roll (15) with cleaning equipment such as a cleaning roll. The temperature roughness of cooling roll (15) is preferably not more than 0.5° C. The speed roughness is preferably not more than 0.5%. The surface of cooling roll (15) can be subjected to hard chromium plating although it is not limited thereto. The surface roughness is preferably not more than 0.1 s. As for a material of touch roll (16), a metal roll or a metal roll around which such as resin or rubber is wound can be utilized.

Further, a crown roll, in which the diameter is varied from the center to side along the width, can be also utilized.

Further, the temperature immediately before adhering to touch roll (16) is preferably not lower than Tg and more preferably not lower than Tg+50° C.

Temperature adjustment of cooling roll (15) is preferably performed by making a heat transfer medium such as water or oil flow inside cooling roll (15).

Film having been solidified by cooling is stretched along the width direction. Molecules are oriented by stretching. In a method for stretching, a tenter (17) well known in the art can be preferably utilized.

Stretching is preferably performed under controlled uniform temperature distribution. The temperature distribution is preferably within ±2° C., more preferably within ±1° C. and specifically preferably within ±0.5° C.

For the purpose of decreasing a dimension variation ratio of the thermoplastic resin film prepared in the above-described method, stretching or shrinking in the longitudinal direction or in the width direction may be performed. To shrink in the longitudinal direction, for example, there is a method to relax film in the longitudinal direction by temporarily clip out of the width stretching, or to shrink film by gradually decreasing the interval between clips adjacent to each other in a lateral stretching machine. The latter method can be practiced, utilizing an ordinary simultaneous biaxial stretching machine, by driving clip portions according to a pantograph method or a linear drive method to smoothly and gradually decrease the interval between clips adjacent to each other in the longitudinal direction. Shrinkage can be performed appropriately in combination with stretching in an arbitrary direction (the diagonal direction). The dimension variation ratio of optical film can be decreased by being shrunk by 0.5-10% either in the longitudinal direction or in the width direction.

Variation of the thickness of the optical film is preferably in the range within preferably ±3%, and more preferably ±1%. In order to reduce the thickness variation, stretching in two directions crossing at a right angle each other is effective, wherein finally, the film is stretched in the casting direction by a ratio of preferably from 1.0 to 2.0, and in the lateral direction by a ratio of preferably from 1.01 to 2.5, and more preferably from 1.01 to 1.5 in the casting direction, and from 1.05 to 2.0 in the lateral direction.

The film stretching method is not specifically limited. As the stretching method, there are a method of stretching a film in the longitudinal direction employing plural rollers having different circumferential speeds, a method of stretching a film in the longitudinal direction by increasing the intervals of the clips or pins fixing the edges of the web (10) in the longitudinal direction, a method of stretching a film by increasing the intervals of the clips or pins fixing the film edges in the lateral direction, and a method of stretching a film in the lateral direction and at the same time in the longitudinal direction by increasing the intervals of the clips or pins fixing the film edges in the longitudinal and lateral directions. These methods may be used in combination.

In a tenter method, when the clips are driven by a linear drive method, smooth stretching of a film can be conducted, whereby problems such as rupture of film can be avoided.

In the film manufacturing process, holding of the film width or stretching in the lateral direction is preferably carried out employing a tenter, and the tenter may be a pin tenter or a clip tenter.

Before winding the film by a winder (19), edges of the film may be removed by slitting in the width of the final product. The both edges of the film may be subjected to a knurling treatment (an embossing treatment) to prevent adhering and scratching while winding. The knurling can be given to the film by heating or pressing a metal ring having projection patterns on the side thereof. The both edge portions of the film where the film is held by clips are usually deformed so that cannot be used as the final product. Therefore such portions are slit off and reused as the material of the film.

In thus obtained thermoplastic film stretched in the lateral direction, the molecules are oriented by the stretching so that the film has certain degree of retardation. The and a polarizing plate protective function in a bodyer of the retardation is preferably smaller and usually not more than 15 nm, preferably not more than 10 nm and more preferably not more than 4 nm.

In view of obtaining a thin liquid crystal display and strength of the film, the thickness of the final optical film produced by the producing apparatus of the present invention is preferably controlled within the range of 10 to 150 μm, although the preferable thickness depends on the purpose. The thickness of the optical film is more preferably controlled within the range of 10 to 100 μm and specifically preferably in the range of 25 to 80 μm.

When a cellulose ester film produced by a producing apparatus according to the present invention is employed as an LCD member, to minimize light leakage, a high degree of flatness is required. The center line mean roughness (Ra) is the value specified in JIS B 0601. Examples of the measurement methods include a needle contact method and an optical method.

The polarizing plate protective film according to the present invention is made from the optical film produced by the producing apparatus according to the present invention, and is a polarizing plate protective film containing irregularly shaped particles and having anisotropy in polarized light scattering. An average of the angle of the longer axis of each particle is 0.5°-40°, provided that the film transportation direction in the production process is 0° and the lateral direction of the film is 90°.

The polarizing plate according to the present invention has a polarizing plate protective film made from the optical film produced by the abovementioned method according to the present invention at least on one surface of the polarizing plate.

The liquid crystal display according to the present invention has an abovementioned polarizing plate at least on one surface of a liquid crystal cell.

Next, these polarizing plate and liquid crystal display employing the polarizing plate will be explained.

A polarizing plate can be prepared by an ordinary method. Cellulose ester film having been subjected to an alkaline saponification treatment is preferably pasted up on at least one surface of a polarizer, which has been prepared by immersing and stretching polyvinyl alcohol type film in an iodine solution, by use of a completely saponified polyvinyl alcohol aqueous solution. Cellulose ester film of the present invention may be utilized also on the other surface, or another polarizing plate protective film may be utilized. As polarizing plate protective film on the other surface, cellulose ester film available on the market can be utilized. For example, as cellulose ester film available on the market, such as KC8UX2M, KC4UX, KC5UX, KC4UY, KC8UY, KC12UR, KC8UY-HA, KC8UX-RHA and KC8UX-RHA-N (these are manufactured by Konica Minolta Opto Inc.) are preferably utilized. In addition to these, film of such as cycloolefin resin, acrylic resin, polyester and polycarbonate may be utilized as polarizing plate protective film on the other surface. In this case, since the saponification adaptability is low, the adhesion process onto a polarizing plate is preferably performed via suitable adhesive layer.

A polarizing plate of the present invention is comprised of cellulose ester film of the present invention being utilized at least one side of a polarizer as polarizing plate protective film. At this time, the slow axis of said cellulose film is preferably arranged practically parallel to or perpendicular to the absorption axis of a polarizer.

This polarizing plate is one of polarizing plates which are arranged to sandwich a liquid crystal cell of an in-plane switching mode, and cellulose ester film of the present invention is preferably arranged on the liquid crystal display cell side.

A polarizer preferably utilized in the present invention includes polyvinyl alcohol type polarizing film, which is classified into polyvinyl type film dyed with iodine and one dyed with dichromatic dye. As polyvinyl alcohol type film, modified polyvinyl alcohol type film modified by ethylene is preferably utilized. As a polarizer, preferably utilized are those prepared by polyvinyl alcohol aqueous solution being cast and the resulting film being uniaxially stretched and dyed or uniaxially stretched after being dyed, followed by being subjected to a durability treatment with a boron compound.

The layer thickness of a polarizer is 5-40 μm, preferably 5-30 μm and specifically preferably 5-20 μm. On said polarizer surface, one surface of cellulose ester film of the present invention is pasted to form a polarizing plate. The pasting up is preferably performed by use of a water based adhesive comprising such as completely saponified polyvinyl alcohol as a primary component. Further, resin film other than cellulose ester film can be adhered on a polarizing plate while a suitable adhesive layer intervenes.

A polarizer is stretched in a mono-axial direction (usually in the longitudinal direction). Consequently, the polarizer shrinks in the stretched direction (usually in the longitudinal direction) and is elongated in the direction perpendicular to the stretched direction (usually in the width direction) when the film is placed under a high temperature and high humidity condition. The elongation and shrinkage of the polarization plate is increased accompanied with decrease of the thickness of the polarizing plate protective film and the shrinkage in the stretched direction of the polarizer is particularly remarkable. The polarizing plate protective film is usually pasted with the polarizer so that the casting direction (MD direction) of the polarizing plate protective film lies in the stretching direction of the polarizer. Therefore, it is important to keep the stretching ratio in the casting direction of the protective film low when the thickness of the protective film is decreased. The cellulose ester film of the present invention is suitable for such a polarizing plate protective film since the film is excellent in the dimensional stability.

The polarizing plate can be constituted by pasting the protective film on one side and a separation film on the other side of the polarizing plate. The protective film and the separation film are used for protecting the polarization plate in the course of forwarding and inspection process.

A liquid crystal display employing the optical film of the present invention exhibits an excellent quality with limited unevenness on the display screen.

A polarizer is stretched in a mono-axial direction (usually in the longitudinal direction). Consequently, the polarizer shrinks in the stretched direction (usually in the longitudinal direction) and is elongated in the direction perpendicular to the stretched direction (usually in the width direction) when the film is placed under a high temperature and high humidity condition. The elongation and shrinkage of the polarization plate is increased accompanied with decrease of the thickness of the polarizing plate protective film and the shrinkage in the stretched direction of the polarizer is particularly remarkable.

The polarizing plate protective film is usually pasted with the polarizer so that the casting direction (MD direction) of the polarizing plate protective film lies in the stretching direction of the polarizer. Therefore, it is important to keep the stretching ratio in the casting direction of the protective film low when the thickness of the protective film is decreased. The cellulose ester film of the present invention is suitable for such a polarizing plate protective film since the film is excellent in the dimensional stability.

The polarizing plate can be constituted by pasting the protective film on one side and a separation film on the other side of the polarizing plate. The protective film and the separation film are used for protecting the polarization plate in the course of forwarding and inspection process.

(Liquid Crystal Display)

A liquid crystal display exhibiting an excellent visibility can be produced with installing a polarizing plate employing the optical film of the present invention.

The liquid crystal display of the present invention preferably has the constitution in that the following components are stacked in that order: adjoining to a light reflection plate, a back light, a light guide plate or a light diffusion plate, a polarizing plate according to the present invention, namely, a polarizing plate protective film having anisotropy in polarized light scattering/a dichroic polarization film in which light absorbing property of a dichroic material is utilized/a polarizing plate protective film, and further stacked are a liquid crystal display panel and a polarizing plate of the viewer side.

The optical film of the present invention is preferably used in the reflection, transparent and translucent LCDs or in the LCDs based on a wide variety of drive modes such as TN, STN, OCB, HAN, VA (PVA and MVA) and IPS modes. Particularly, the display apparatus having a large screen size such as 30 inch model or greater, especially in the range of 30-54 inch model is free of any white patch on the peripheral area. The effect can be maintained for a long time. A remarkable effect is observed in the MVA mode liquid crystal display. Especially, elimination of uneven color arrangement, glitter or wavy unevenness is achieved. Thus, user's eyes are not adversely affected after long-time viewing.

As described above, a liquid crystal display having a polarizing plate of the present invention on one surface of the liquid crystal cell exhibits an extremely excellent display quality.

EXAMPLES

In the following, the present invention is specifically explained with reference to examples which exemplifies melt casting of cellulose ester, however, the present invention is not limited thereto.

Example 1

Preparation of Cellulose Ester Film

| (Thermoplastic resin) | |
|---|---|
| Cellulose acetate propionate (acetyl substitution degree: 2.0, propionyl substitution degree: 0.7, number average molecular weight: 75,000) | 100 mass parts |
| (Plasticizer) | |
| Trimethylolpropane tribenzoate | 10 mass parts |
| Sumilizer GP | 0.5 mass parts |

| -continued | |
|---|---|
| (Antioxidant) | |
| Irganox 1010 (manufactured by Ciba Specialty Chemicals Inc.) | 1 mass part |
| TiO$_2$ of needle form (manufactured by Ishihara Sangyo Kaisha, Ltd., product name: FTL-100) | 5 mass parts |

First, cellulose acetate propionate was dried in air at 120° C. for 1 hour followed by being left to cool down to room temperature. Next, cellulose acetate propionate having been dried was heated by use of an extruder to prepare pellets, which were then left to cool.

According to FIG. 1, pellets of cellulose, plasticizers, an antioxidant and needle form particles were charged while mixing into raw material supply hopper (11), and the raw materials were conveyed at a supply rate of 2.0 kg/hr to Henschel mixer (12) to be mixed. Raw materials having been mixed were conveyed to extruder (13) to be melted with heat at 250° C., and the melted substance was extrusion molded through casting die (1) (casting die A shown in FIG. 2a and FIG. 2b) according to the present invention.

Herein, casting die A is equipped with inlet portion (2), manifold portion (3), and a slit potion constituted of extending portion (4) and land portion (5) through which a film form melted substance is extruded, in the order from the upstream in the melted substance extruding direction; and satisfies claim 1 of the present invention, that is, the cross-sectional form of extending portion (4) satisfies following equation (1) and the cross-sectional form of land portion (5) satisfies following equation (2), respectively.

$$A1<A2 \quad (1)$$

In the above equation, A1 and A2 each represent cross-sectional areas at arbitrary position P1 of intermediate die extending portion (4) and arbitrary position P2 in the upstream in melted substance extruding direction, respectively.

$$A3=A4 \quad (2)$$

In the above equation, A3 and A4 represent cross-sectional areas at arbitrary positions P3 and P4 different from each other in land portion (5).

Herein, the length of land portion (5) of casting die A is 40 mm which is the lower limit value of claim 2.

Next, a melted substance having been extruded from casting die (1) is cooled and surface corrected by cooling roll (15). In this case, web (film) (10) and cooling roll (15) are preferably brought in close contact, and the web is pressed by use of such as touch roll (16) as a method to make the web adhere to cooling roll (15).

Successively, web (film) (10) is guided to a stretcher (not shown in the drawing), being stretched at a temperature of 150° C. in the longitudinal direction by the stretcher, and then, the resulting film is stretched at a temperature of 160° C. in the width direction by use of tenter (17) followed by being relaxed, being transported by transport roll (18), and was wound at 30° C. by winder (19), whereby cellulose acetate propionate film of a roll form is prepared.

Examples 2-4

Figure 2A:
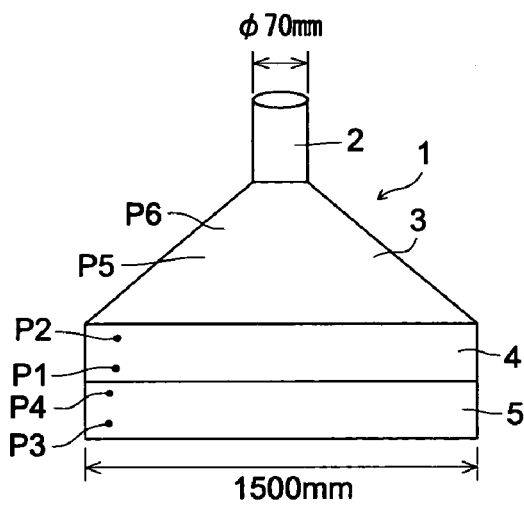
FIG. 2a is a schematic front view of casting dies A-D, I and J utilized in a casting process of a melted substance in a manufacturing method of the optical film.
Figure 2B:
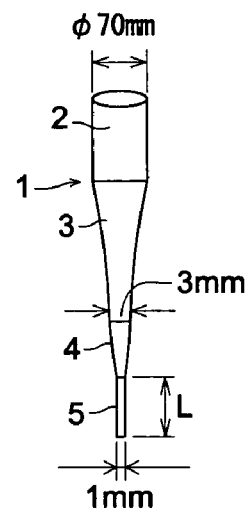
FIG. 2b is a schematic side view of the same.

Cellulose acetate propionate films were prepared in a similar manner to example 1, except that casting die was changed into casting dies B-D shown in FIG. 2a and FIG. 2b.

Herein, casting die B has a length of land portion (5) of 70 mm and casting die C has a length of land portion (5) of 100 mm both of which are a medium value of claim 2; and casting die D has a length of land portion (5) of 200 mm which is the upper limit value of claim 2.

Example 5

Figure 3A:
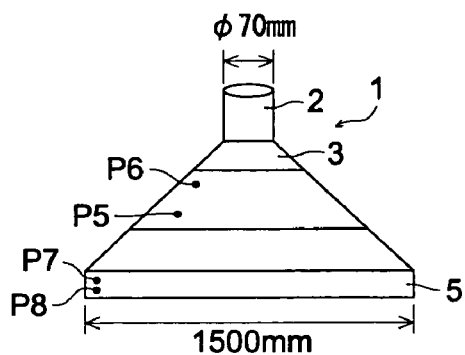
FIG. 3a is a schematic front view of casting dies E-H, L and M utilized in a casting process of a melted substance in a manufacturing method of the optical film.
Figure 3B:
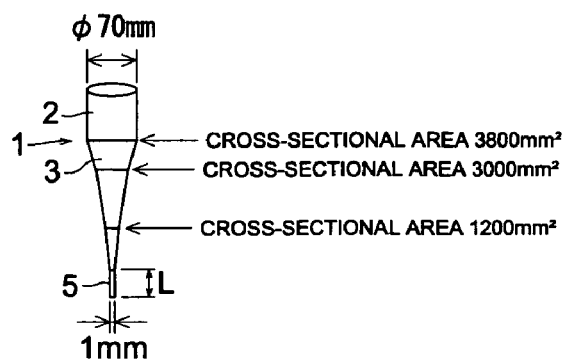
FIG. 3b is a schematic side view of the same.

A cellulose acetate propionate film was prepared in a similar manner to example 1, except that casting die A was changed into casting die E shown in FIG. 3a and FIG. 3b.

Herein, casting die K is equipped with inlet portion (2), manifold portion (3) and land portion (5) through which a film form melted substance is extruded in the order from the upstream in the melted substance extrusion direction and the cross-sectional form of manifold portion (3) satisfies following equation (3) and the cross-sectional form of land portion (5) satisfies following equation (4), which are the conditions of claim 3 of the present invention, respectively.

$$A5<A6 \quad (3)$$

In the above equation, A5 and A6 each represent cross-sectional areas at arbitrary position P5 of the manifold portion and arbitrary position P6 in the upstream in melted substance extruding direction, respectively.

$$A7=A8 \quad (4)$$

In the above equation, A7 and A8 represent cross-sectional areas at arbitrary positions P7 and P8 different from each other on land portion (5).

Herein, the length of land portion (5) of casting die E is 40 mm which is the lower limit value of claim 4.

Examples 6-8

Cellulose acetate propionate film was prepared in a similar manner to example 5, except that casting die E was changed into casting dies F-H shown in FIG. 3a and FIG. 3b.

Herein, the length of land portion (5) of casting die F is 70 mm and the length of land portion (5) of casting die G is 100 mm both of which are the intermediate value of claim 4; and the length of land portion (5) of casting die H is 200 mm which is the upper limit value of claim 4.

Comparative Examples 1 and 2

For comparison, cellulose acetate propionate film was prepared in a similar manner to example 1, except that casting die A was changed into casting dies I and J shown in FIG. 2a and FIG. 2b.

Herein, casting die I has a length of land portion (5) of 10 mm and casting die J has a length of land portion (5) of 500 mm, both of which are out of the range of claim 2 of the present invention.

Herein, in the case of utilizing casting die J of example 2, casting of a melted substance was impossible.

Figure 4A:
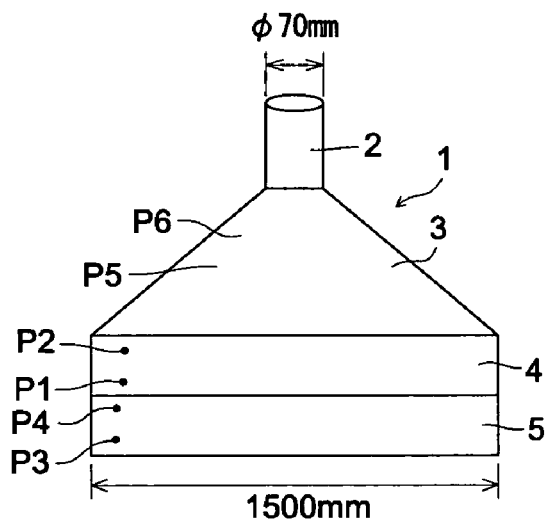
FIG. 4a is a schematic front view of casting die K utilized in a casting process of a melted substance in a manufacturing method of the optical film.
Figure 4B:
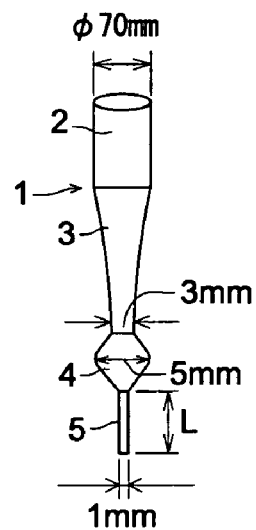
FIG. 4b is a schematic side view of the same.

For comparison, cellulose acetate propionate film was prepared in a similar manner to example 1, except that casting die A was changed into casting die K shown in FIG. 4a and FIG. 4b.

Herein, with respect to casting die K, the cross-sectional form of extending portion (4) does not satisfy equation (1) A1<A2, which is the condition of claim 1 of the present invention, but contrary satisfies A1>A2.

In the above equation, A1 and A2 each represent cross-sectional areas at arbitrary position P1 of an intermediate die extending portion and arbitrary position P2 in the upstream in the melted substance extruding direction, respectively.

Comparative Examples 4 and 5

For comparison, cellulose acetate propionate film was prepared in a similar manner to example 5, except that casting die E was changed into casting dies L and M shown in FIG. 3a and FIG. 3b.

Herein, casting die L has a length of land portion (5) of 10 mm, casting die M has a length of land portion (5) of 500 mm, both of which are out of the range of claim 4 of the present invention.

Herein, in the case of utilizing casting die M of example 5, casting of a melted substance was impossible.

Comparison 6

Figure 5A:
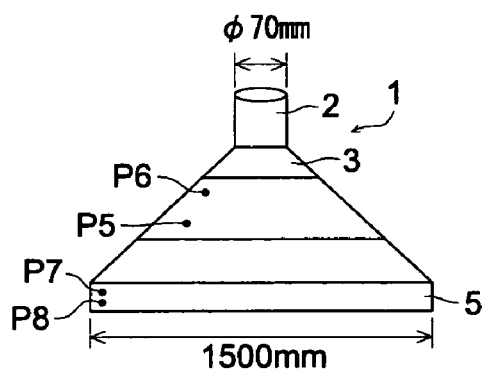
FIG. 5a is a schematic front view of casting die N utilized in a casting process of a melted substance in a manufacturing method of the optical film.
Figure 5B:
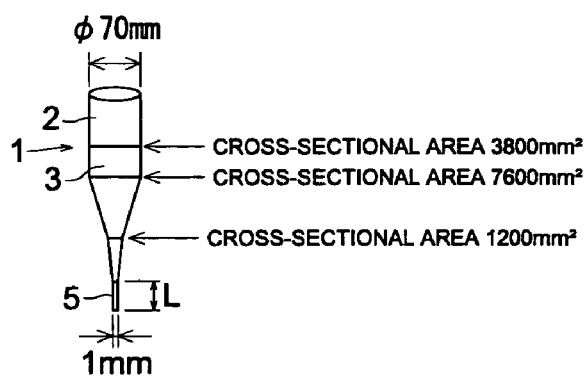
FIG. 5b is a schematic side view of the same.

For comparison, cellulose acetate propionate film was prepared in a similar manner to example 5, except that casting die E was changed into casting die N shown in FIG. 5a and FIG. 5b.

Herein, with respect to casting die N, the cross-sectional form of manifold portion (3) does not satisfy equation (3) A5<A6, which is the condition of claim 3 of the present invention, but the cross-sectional area of intermediate potion in the height of manifold portion (3) is made larger to satisfy A5>A6.

In the above equation A5 and A6 represent arbitrary position P5 of manifold portion (3) and position P6 in the upstream in the melted substance extrusion direction, respectively.

<Measurement of Orientation Angle of Irregularly Shaped Particles>

From a vicinity portion of the surface of cellulose acetate propionate film which had been prepared in above-described examples 1-8 and comparative examples 1, 3, 4 and 6, thin pieces having a thickness of approximately few hundreds nm were cut out by use of a microtome, said pieces being photographed through a transmission electron microscope at a magnification of 20,000, and the images were read utilizing a flat bed scanner at 300 dpi and monochromatic 256 gradation to be taken in Image Processing Software WinROOF (manufactured by Mitsuya Shoji Co., Ltd.) having been installed on a personal computer. Images having been taken in were subjected to image extraction of the domain, confirming not less than 300 of irregularly shaped particles being present on the image plane after image extraction of irregularly shaped particles, manual adjustment is performed to make detection and extraction of not less than 300 of irregularly shaped particles in the case of insufficient extraction. In this manner, with respect to each irregularly shaped particle of image data having been extraction processed, measurement of a long axis diameter/a short axis diameter (a length in the long axis direction/a length in the short axis direction) was performed to calculate a number average aspect ratio of irregularly shaped particles. Further, when an angle between the film forming direction of polarizing plate protective film and the long axis direction of an irregularly shaped particle is designated as an orientation angle, each angle between this axis and each of approximately 300 irregularly shaped particles was measured after position determination of film pieces in the film forming direction by use of a transmission electron microscope, whereby an average of absolute values of said orientation angle was calculated by number averaging the sum thereof. The obtained result was shown in following Table 1.

<Appearance Evaluation of Display Image Plane and Image>

A polarizing plate was prepared employing prepared cellulose acetate propionate film, which was pasted on a panel to perform a visual appearance evaluation.

(Preparation of Polarizing Plate)

Polyvinyl alcohol film having a thickness of 50 μm was uniaxially stretched (temperature: 100° C., stretching magnification: 5 times) in the film forming direction. This was immersed in an aqueous solution comprising the composition of 0.075 g of iodine, 6 g of potassium iodide and 100 g of water. The resulting film was washed with water and dried to prepare a polarizer. This polarizer had an absorption axis along the film forming direction.

Next, a polarizing plate was prepared according to the following first process to fifth process.

The first process: Cellulose acetate propionate film which had been prepared in the aforesaid examples and comparative examples as a polarizing plate protective film was immersed in 2 mol/L sodium hydroxide solution at 60° C. for 90 seconds followed by being washed with water and dried, whereby the side to be pasted on a polarizer was saponificated.

Similarly, as a polarizing plate protective film for the opposite side, cellulose acetate propionate film KC8UCR-5 (manufactured by Konica Minolta Opto. Inc.: retardation film) available on the market was also saponificated.

The second process: The aforesaid polarizer was immersed in a bath containing a polyvinyl alcohol adhesive at 2 mass solid content for 1-2 seconds.

The third process: The excess adhesive adhered to a polarizer in the second process was lightly wiped off, said polarizer being placed on the saponificated surface of brightness improved cellulose acetate propionate film as a polarizing plate protective film having been processed in the first process, and further cellulose acetate propionate (TAC) film KC8UCR-5 available on the market was accumulated as a polarizing plate protective film for the opposite side so as to make the saponificated surface contact with the polarizer, whereby a polarizing plate was prepared.

The fourth process: The polarizing plate comprising a polarizer having been accumulated with cellulose acetate propionate film and cellulose acetate (TAC) film in the third process was pasted up at a pressure of 20-30 N/cm² and a transport speed of approximately 2 m/minute.

The fifth process: The polarizing plate having been prepared in the fourth process was dried in a drier at 80° C. for 2 minutes.

<Evaluation of Polarizing Plate>

The following evaluations were performed with respect to polarizing plates prepared in the above manner.

(Preparation of Liquid Crystal Display Device)

A liquid crystal panel for visual recognition evaluation was prepared in the following manner.

The polarizing plate on the backlight side of 15 Type Liquid Crystal Display VL-1530S manufactured by Fujitsu Corp. having been pasted up in advance was peeled off, and the above-prepared polarizing plates each were pasted up on the glass surface, respectively.

At that time, the pasting direction of a polarizing plate was set to make the plane of cellulose acetate propionate of said polarizing plate on the backlight side and the absorption axis direct the same direction with that of a polarizing plate having been pasted up in advance, whereby each liquid crystal display device was prepared.

(Evaluation of Brightness Improvement Effect)

Front brightness of prepared liquid crystal display devices was visually evaluated. The evaluation was performed based on the following 4 steps of A-D.

A: Very high brightness improvement effect is observed.
B: Brightness improvement effect is observed.
C: Slight brightness improvement effect is observed.
D: No brightness improvement effect is observed.

TABLE 1

| | Type of die | Length of land portion (mm) | Mean orientation angle (center) (°) | Mean orientation angle (edge) (°) | Brightness improvement effect |
|---|---|---|---|---|---|
| Example 1 | Die A | 40 | 15 | 17 | B |
| Example 2 | Die B | 70 | 13 | 16 | A |
| Example 3 | Die C | 100 | 12 | 14 | A |
| Example 4 | Die D | 200 | 8 | 9 | A |
| Example 5 | Die E | 40 | 15 | 18 | B |
| Example 6 | Die F | 70 | 13 | 17 | A |
| Example 7 | Die G | 100 | 11 | 15 | A |
| Example 8 | Die H | 200 | 9 | 11 | A |
| Comp. 1 | Die I | 10 | 26 | 33 | C |
| Comp. 2 | Die J | 500 | — | — | — |
| Comp. 3 | Die K | 40 | 34 | 36 | D |
| Comp. 4 | Die L | 10 | 27 | 33 | C |
| Comp. 5 | Die M | 500 | — | — | — |
| Comp. 6 | Die N | 40 | 26 | 28 | C |

Comp.: Comparative Example

It is clear from above-described Table 1 that, as is clear from the comparison of examples 1-4 of the present invention with comparative examples 1-3, irregularly shaped particles having a needle form are easily orientated in the casting direction of a melted substance and the mean orientation degree of particles is improved resulting in an enhanced brightness improvement effect, when the cross-sectional form of extending portion (4) satisfies above equation (1) A1<A2, and the cross-sectional form of land portion (5) satisfies above equation (2) A3=A4, respectively, in casting die (1).

Further, it is clear from the comparison of examples 5-8 of the present invention with comparative examples 4-6, that irregularly shaped particles having a needle form are easily orientated along the casting direction of a melted substance and a mean orientation degree of particles is improved resulting in an enhanced brightness improvement effect, when the cross-sectional form of manifold portion (3) satisfies above equation (3) A5<A6, and the cross-sectional form of land portion (5) satisfies above equation (4) A7=A8 in casting die (1), respectively.

What is claimed is:

1. A method of manufacturing an optical film, the method comprising:
   extruding a melted substance comprising a thermoplastic resin and irregularly shaped particles on a support from a casting die to form the optical film;
   wherein the casting die is equipped with, in order from an upstream side of an extruding direction of the melted substance:
      an inlet portion through which the melted substance flows in;
      a manifold portion; and
      a slit portion comprising an extending portion and a land portion, the melted substance being ejected from the land portion;
   wherein cross-sectional shapes of the extending portion satisfy the following equation (1) and cross-sectional shapes of the land portion satisfy the following equation (2):

$$A1<A2 \tag{1}$$

wherein A1 represents a cross-sectional area at an arbitrary position P1 in the extending portion and A2 represents a cross-sectional area at a position P2 which is upstream of the extruding direction of the melted substance in the extending portion, and $$A3=A4 \tag{2}$$

wherein A3 and A4 represent cross-sectional areas at arbitrary positions P3 and P4, respectively, in the land portion, positions P3 and P4 being different from each other.

2. The method of claim 1, wherein a length of the land portion is 40-200 mm.

3. A method of manufacturing an optical film, the method comprising:
    extruding a melted substance comprising a thermoplastic resin and irregularly shaped particles from a casting die on a support to form the optical film;
    wherein the casting die is equipped with, in order from an upstream side of an extruding direction of the melted substance:
        an inlet portion through which the melted substance flows in;
        a manifold portion; and
        a land portion from which the melted substance is ejected;
    wherein cross-sectional shapes of the manifold portion satisfy the following equation (3) and cross-sectional shapes of the land portion satisfy the following equation (4):

$$A5<A6 \tag{3}$$

wherein A5 represents a cross-sectional area at an arbitrary position P5 in the manifold portion and A6 represents a cross-sectional area at a position P6 which is upstream of the extruding direction of the melted substance in the manifold portion; and $$A7=A8 \tag{4}$$

wherein A7 and A8 represent cross-sectional areas at arbitrary positions P7 and P8, respectively, in the land portion, positions P7 and P8 being different from each other.

4. The method of claim 3, wherein a length of the land portion is 40-200 mm.

5. The method of claim 1, wherein an aspect ratio of the irregularly shaped particles is 2 or more.

6. The method of claim 1, wherein an aspect ratio of the irregularly shaped particles is 2 to 40.

7. The method of claim 1, wherein the irregularly shaped particles are titanium dioxide particles.

8. The method of claim 1, wherein:
    the thermoplastic resin is a cellulose ester; and
    a mass ratio of the irregularly shaped particles to the cellulose ester is 0.001<(the irregularly shaped particles)/(the cellulose ester)<15.

9. The method of claim 1, wherein a refractive index of the irregularly shaped particles is 1.3 to 3.0.

10. The method of claim 3, wherein an aspect ratio of the irregularly shaped particles is 2 or more.

11. The method of claim 3, wherein an aspect ratio of the irregularly shaped particles is 2 to 40.

12. The method of claim 3, wherein the irregularly shaped particles are titanium dioxide particles.

13. The method of claim 3, wherein:
    the thermoplastic resin is a cellulose ester; and
    a mass ratio of the irregularly shaped particles to the cellulose ester is 0.001<(the irregularly shaped particles)/(the cellulose ester)<15.

14. The method of claim 3, wherein a refractive index of the irregularly shaped particles is 1.3 to 3.0.

* * * * *